United States Patent [19]

Shimura et al.

[11] Patent Number: 5,453,819
[45] Date of Patent: Sep. 26, 1995

[54] CHARGER APPARATUS

[75] Inventors: Hidetsugu Shimura; Hajime Kurihara; Akihiko Ikegami; Takehiko Okamura; Takashi Hama; Kenjiro Yoshioka, all of Nagano, Japan

[73] Assignee: Seiko Epson Corporation, Tokyo, Japan

[21] Appl. No.: 214,268

[22] Filed: Mar. 17, 1994

[30] Foreign Application Priority Data

| Mar. 17, 1993 | [JP] | Japan | 5-057429 |
| Oct. 15, 1993 | [JP] | Japan | 5-258768 |
| Oct. 20, 1993 | [JP] | Japan | 5-262684 |

[51] Int. Cl.$^6$ ............................................. G03G 15/02
[52] U.S. Cl. .................... 355/219; 361/225; 361/230
[58] Field of Search ..................... 355/219; 361/225, 361/230, 212, 220

[56] References Cited

U.S. PATENT DOCUMENTS

| 5,192,974 | 3/1993 | Ikegawa et al. . |
| 5,243,387 | 9/1993 | Ikegawa . |

FOREIGN PATENT DOCUMENTS

| 0367203 | 5/1990 | European Pat. Off. . |
| 0554114 | 8/1993 | European Pat. Off. ............... 355/219 |
| 0198468 | 8/1990 | Japan .................................... 355/219 |
| 4086681 | 3/1992 | Japan . |
| 0145463 | 5/1992 | Japan .................................... 355/219 |
| 0072869 | 3/1993 | Japan .................................... 355/219 |
| 2272581 | 5/1994 | United Kingdom . |

*Primary Examiner*—Matthew S. Smith
*Attorney, Agent, or Firm*—Sughrue, Mion, Zinn, Macpeak & Seas

[57] ABSTRACT

A charger capable of reliably and uniformly maintaining a discharging gap formed in the vicinity of a contact portion between a charging member and a photosensitive member. A charging member 101 is arranged by supporting and fixing both ends of a flexible film 102 by means of support members 103 to 105. The film 102 forms a flexible portion oriented downwardly from fixed ends S1, S2. The film 102 is brought into contact with the member 110 to be charged in a state in which an unsupported side of the film 102 is oriented toward the downstream side in the rotating direction of the member 110 to be charged. Then, the film 102 is brought into contact with the member 110 to be charged in a contact area N, and the radius of curvature of the film 102 in a zone P2 located downstream of that zone N in the rotating direction of the member 110 to be charged becomes smaller than the radius of curvature of the film 102 in an upstream zone P1.

31 Claims, 9 Drawing Sheets

CHARGER APPARATUS

BACKGROUND OF THE INVENTION

1. Field of the Invention

The present invention relates to a charger for use in image forming apparatuses such as printers, video printers, facsimile machines, copying machines, and displays. More particularly, the present invention concerns a charger for effecting a charging process or a discharging process by causing a charging member with a voltage applied thereto from the outside to be brought into contact with a member to be charged.

2. Description of the Background Art

Hereafter, a description will be given of a charger used for an image forming apparatus for image formation by means of electrophotography using a photosensitive member as a member to be charged.

A charger is known which effects a charging process by causing a charging member with a voltage applied thereto from the outside to be brought into contact with a member to be charged. In this charger, the charging member is brought into contact with the surface of a photosensitive member, i.e., the member to be charged, which produces a gap (i.e., a discharging gap) in the vicinity of a contact portion between the charging member and the photosensitive member, and the photosensitive member is charged through a discharging phenomenon occurring at this gap. This charger has come to attract attention and has been commercialized since it has advantages in that, as compared with a corona charger, a low voltage power supply can be used and the amount of ozone produced is very small.

Conventional charging members include an electrically conductive fiber brush such as the one disclosed in Japanese Patent Application Laid-Open No. 19837/1980, an electrically conductive resilient roller such as the one disclosed in Japanese Patent Application Laid-Open No. 132356/1981, and an electrically conductive blade such as the one disclosed in Japanese Patent Publication No. 14701/1990.

Furthermore, in recent years, chargers which use flexible films as charging members have been proposed.

Japanese Patent Application Laid-Open No. 86681/1992 discloses a charge which is arranged such that both ends of a flexible film (which is stated as a sheet in its specification) are supported, and the center of a slack portion is brought into contact with a photosensitive member. In addition, U.S. Pat. No. 5,192,974 discloses a charger which is arranged such that one end of a flexible film is supported, and a free end thereof is brought into contact with a photosensitive member. Furthermore, U.S. Pat. No. 5,243,387 discloses a charger which is arranged such that a tube having an inside diameter greater than the diameter of a rotatable roller is fitted over the roller, and a side of the tube located away from a photosensitive member is pressed against the roller, thereby causing a slack portion to be brought into contact with a photosensitive member.

In addition, to secure a uniform charging property, applications for patent have been filed which specify the surface roughness of charging members. For example, Japanese Patent Application Laid-Open No. 132356/1981 discloses the relationship between the surface roughness of an electrically conductive roller and nonuniformity in charging. U.S. Pat. No. 5,008,796 specifies the relationship in surface roughness between a charging member and a photosensitive member. Japanese Patent Application Laid-Open No. 198468/1990 specifies a range of the maximum roughness of a charging member.

However, in the case of the charger disclosed in Japanese Patent Application Laid-Open No. 86681/1992, the state of contact between the charging member and the photosensitive member cannot be determined precisely since it depends upon the manner in which the film is slackened. Since the state of contact is indeterminate, the discharging gap formed in the vicinity of the contact portion is also indeterminate and is unstable. Accordingly, there exists a problem in that uniformity in charging cannot be obtained. Furthermore, since the state of contact of the film is indeterminate, there exists another problem in that the film taps the photosensitive member, generating charging noise.

In the case of the charger disclosed in U.S. Pat. No. 5,243,387 as well, the state of contact between the charging member and the photosensitive member is indeterminate since it depends upon the manner in which the tube is slackened. Accordingly, there exists the problem that uniformity in charging cannot be obtained. Additionally, there exists a problem in that the arrangement is complex.

Furthermore, in the case of the charger disclosed in U.S. Pat. No. 5,192,974, if a ridgeline of the free end of the film is slightly deformed, or if the ridgeline is formed inaccurately, the contact between the film and the photosensitive member becomes nonuniform. As a result, the discharging gap formed in the vicinity of the contact portion becomes nonuniform and lacks stability. Hence, there exists the problem that uniformity in charging cannot be obtained.

It is mentioned in Japanese Patent Application Laid-Open No. 86681/1992 that an electric field is produced between the charging member and a rear surface-side electrically conductive layer of the member to be charged, and an electric force is generated. In this publication, however, that electric force is only ascertained as a cause for the generation of vibration or noise at the time of superposition of an ac voltage, and there is no consideration given to actively using the electric force as a pressure contact force.

Accordingly, the present invention has been devised to overcome these problems, and its object is to provide a charger capable of positively and uniformly maintaining a discharging gap formed in the vicinity of a contact portion between the charging member and the photosensitive member.

Another object is to provide a charger which avoids the frictional deterioration of the photosensitive member or the charging member and is capable of effecting a stable and reliable charging process.

Still another object is to provide a charger which prevents foreign objects, such as toner, toner additives, paper dust, and the like, from to remaining in the vicinity of the contact portion between the charging member and the photosensitive member.

SUMMARY OF THE INVENTION

In accordance with the present invention, there is provided a charger for effecting a charging process by bringing a charging member with a voltage applied thereto from an outside source into contact with a member to be charged, characterized in that the charging member is arranged with both ends of a flexible film supported by a support member, and that the film assumes a shape in which a radius of curvature of a portion of the film located downstream of an area of contact between the film and the member to be charged in a moving direction of the member to be charged is smaller than a radius of curvature of a portion of the film located upstream of the area of contact.

In addition, in accordance with the present invention, there is provided a charger for effecting a charging process by bringing a charging member with a voltage applied thereto from an outside into contact with a member to be charged, characterized in that the charging member is arranged with both ends of a flexible film supported by a support member, and that if it is assumed that a distance between fixed ends of the film is L1, and a length which gives a maximum distance of the film on a curve of the film is set as L4, then L1<L4.

In addition, in accordance with the present invention, there is provided a charger for effecting a charging process by bringing a charging member with a voltage applied thereto from an outside into contact with a member to be charged, characterized in that a contacting force of the charging member with respect to the member to be charged is mainly imparted by an electrostatic attracting force, and the contacting force based on the electrostatic attracting force is greater than a mechanical contacting force.

In addition, in accordance with the present invention, there is provided a charger for effecting a charging process by bringing a charging member with a voltage applied thereto from an outside into contact with a member to be charged, characterized in that if it is assumed that a 10-point mean roughness of the charging member is Rz, a height of an incidental projection which is present on a surface of the charging member is not more than $(Rz/2+4.4)$ (μm).

BRIEF DESCRIPTION OF THE DRAWINGS

FIG. 1(a) is a schematic cross-sectional view of a charging member, and FIG. 1(b) is a schematic cross-sectional view of the charger with the charging member shown in FIG. 1(a) in an operational position;

FIGS. 5(a) and 5(b) are schematic cross-sectional views illustrating still another embodiment of the charger in accordance with the present invention, in which FIG. 5(a) shows a state of nonoperation, and FIG. 5(b) shows a state of operation;

FIG. 10(a) shows the state of nonoperation, and FIG. 10(b) shows the state of operation;

DESCRIPTION OF THE PREFERRED EMBODIMENTS

EMBODIMENT 1

Figure 1A:
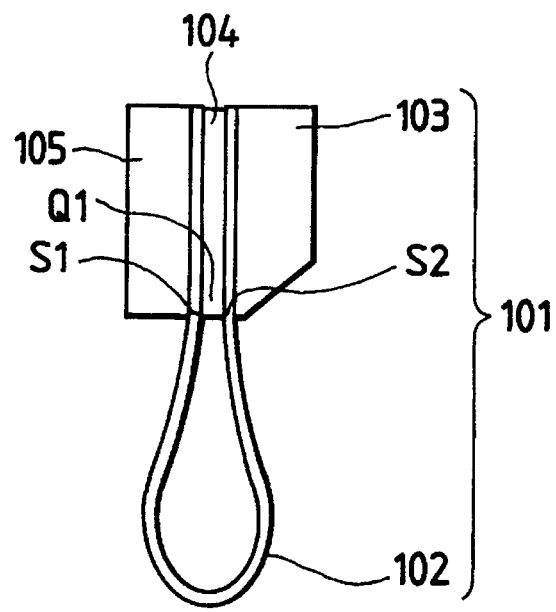
FIGS. 1(a) and 1(b) are schematic cross-sectional views illustrating an embodiment of a charger in accordance with the present invention.

Referring now to the drawings, a detailed description will be given of the present invention.

Figure 1B:
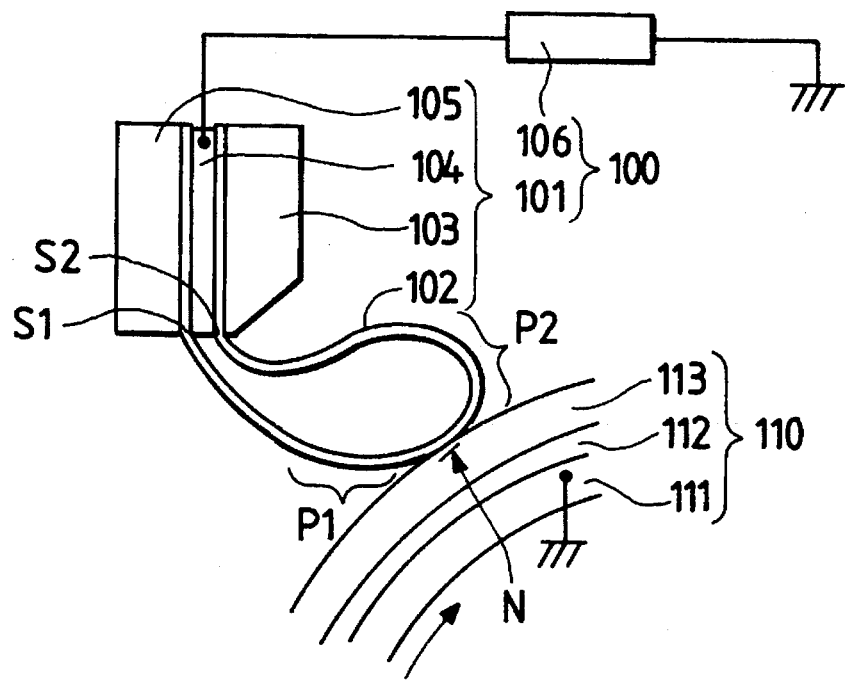

FIGS. 1(a) and 1(b) provide cross-sectional views illustrating a form embodying the charger in accordance with the present invention.

FIG. 1(a) is a schematic cross-sectional view of a charging member. A charging member 101 is shown in a state in which both ends of a flexible film 102 are supported and fixed by support members 103–105, and an unsupported portion of the film 102 is oriented vertically downward. The film 102 forms a flexible portion oriented downwardly from fixed ends S1, S2. As shown, if the distance between the fixed ends (the linear distance between the fixed ends S1 and S2) is made short, this flexible portion depicts a shape similar to that of a teardrop owing to certain forces that resist film bending.

FIG. 1(b) shows a state in which the charging member 101 shown in FIG. 1(a) is brought into contact with a member 110 to be charged, such that the unsupported portion of the film 102 is oriented toward the downstream side in the rotating direction (in the direction of the arrow in the drawing) of the member 110 to be charged. As shown in the drawing, the film 102 maintains a shape similar to that of a teardrop. The film 102 is brought into contact with the member 110 to be charged in a contact zone N, and the radius of curvature of the film 102 in a zone P2 located downstream of the zone N in the rotating direction of the member 110 to be charged becomes smaller than the radius of curvature of the film 102 in an upstream zone P1. The arrangement in which the film 102 is brought into contact with the member 110 to be charged in this manner is a typical example of the embodiment of the present invention.

Next, a description will be given of an example in which the charging process is carried out by bringing such a charging member into contact with a photosensitive member, i.e., the member to be charged.

In FIG. 1(b), the member 110 to be charged is arranged such that an undercoating layer 112 and a photosensitive layer 113 are formed in that order on an electrically conductive substrate 111. The member 110 to be charged is arranged to be rotatable in the direction of the arrow by an unillustrated driving means. Meanwhile, in a charger 100, the support member 104 is connected to a power supply 106. Then, if the member 110 to be charged is moved in the direction of the arrow, and if, at the same time, a voltage is supplied from the power supply 106 to the charging member 101, the member 110 to be charged is subjected to a charging process.

In a specific example, while the member 110 to be charged was being rotatively driven at a linear velocity of 30 (mm/s), a dc voltage Va was supplied to the charging member 101 by the power supply 106, and a surface potential Vs of the member 110 to be charged immediately after the charging process was measured. Between the measurement of surface potential and the charging process, however, the surface potential Vs was initialized by an unillustrated discharging means. It should be noted that the photosensitive layer 113 of the member 110 to be charged was an organic photosensitive layer of a negative-charge starting function separated type, and had a dielectric constant of 3.3 and a thickness of 20 (μm).

As for the shape of the film 102, the shape shown in FIG. 1(*b*) was maintained whether or not the charging process was carried out. Namely, even if the member 110 to be charged was rotated and a voltage was applied, the shape of the film 102 did not change.

Figure 2:
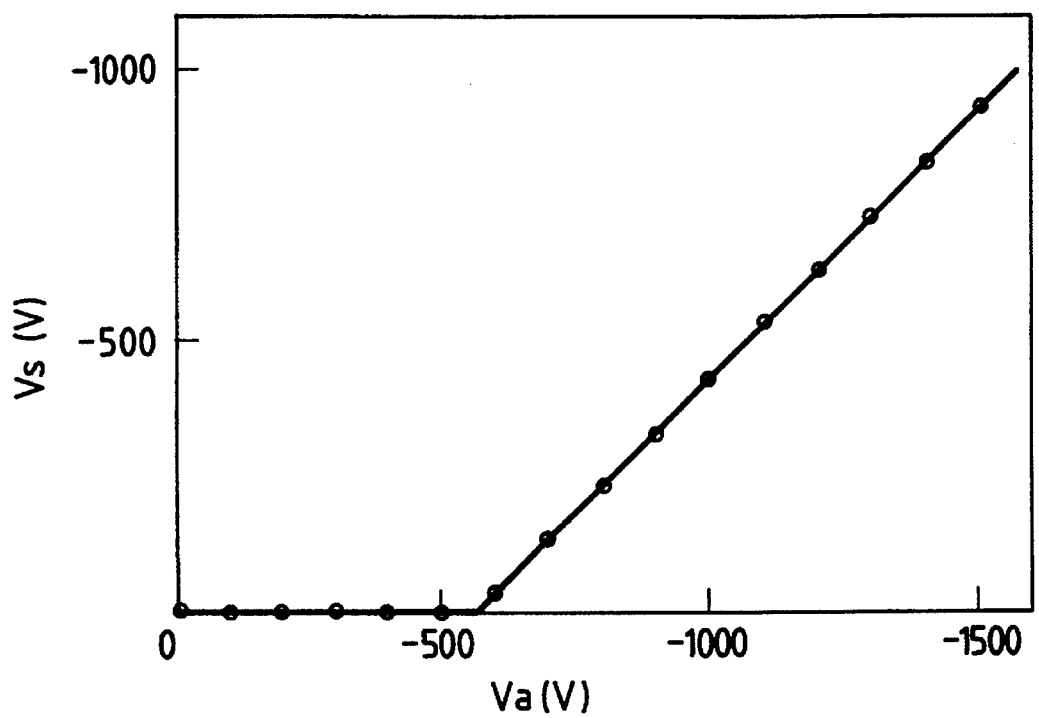
FIG. 2 is a diagram illustrating the relationship between a voltage Va supplied to the charging member and a resultant surface potential Vs of a member to be charged in the charger in accordance with the present invention.

The relationship between the supplied voltage Va and the resultant surface potential Vs is shown in FIG. 2. In the drawing, the abscissa represents the voltage Va applied to the charging member 101, and the ordinate represents the surface potential Vs. In the drawing, the mark 0 represents a measured point, and the solid line is a line connecting the measured points. From the results, it can be seen that the member 110 to be charged is not charged in the range 0 (V)>Va>−565 (V). In other words, a charge starting voltage Vth is −565 (V). In a region in which the absolute value of Va is 565 (V) or more, the graph becomes a straight line with a gradient 1. In other words, the surface potential Vs (V) of the member 110 to be charged is expressed as follows:

| Vs = 0 | 0 > Va > −565 |
| Vs = Va + 565 | −565 ≧ Va |

Figure 3:
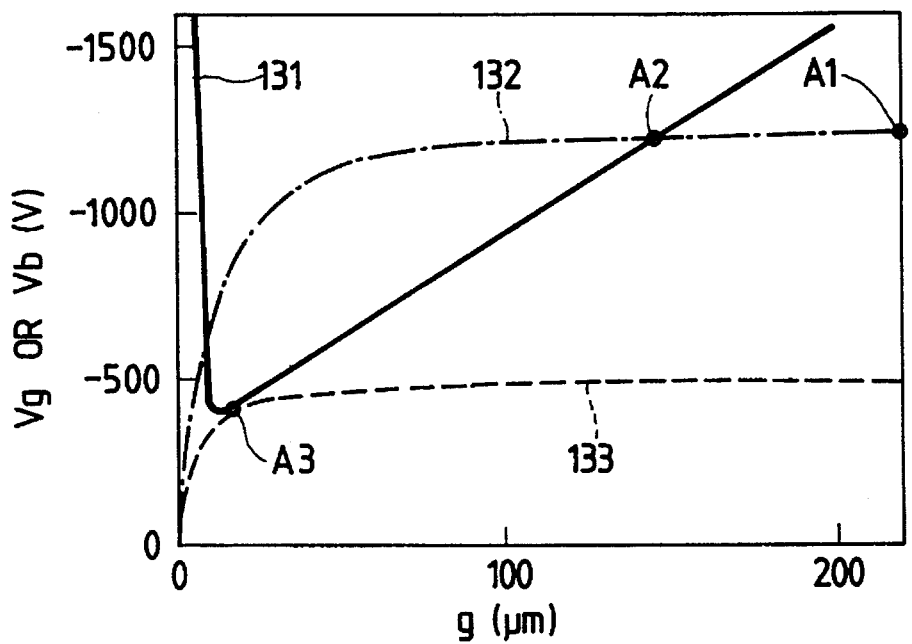
FIG. 3 is a diagram illustrating the relationship between a Paschen's curve and a gap voltage Vg with respect to a gap distance g.

Referring to FIG. 3, this can be explained as follows.

FIG. 3 is a diagram illustrating a Paschen's curve and curves of the relationship between a gap distance g and a gap voltage Vg. In the drawing, the abscissa represents the gap distance g between the member to be charged and the charging member, and the ordinate represents the gap voltage Vg or a breakdown voltage Vb. A curve 131 (shown by the solid line) is a Paschen's curve which represents the breakdown voltage Vb determined by the gap distance g. A curve 132 (shown by the alternate long and short dash line) is a curve of the relationship between the gap distance g and the gap voltage Vg in a case where the potential difference between the member to the charged and the charging member is relatively large. A curve 133 (shown by the broken line) is a curve of the relationship between the gap distance g and the gap voltage Vg in a case where a potential difference, which is at a limit of occurrence of discharge, exists in the gap.

When the gap voltage Vg, which is divided by the gap (discharging gap) existing between the charging member and the surface of the member to be charged, exceeds the breakdown voltage Vb, the phenomenon of discharge from the charging member to the member to be charged takes place. To give a specific explanation, when the charging member and the surface of the member to be charged approach each other gradually, the gap distance g decreases. Then, the voltage Vg shifts from point A1 to point A2, and as the electrostatic capacity at the gap increases, the gap voltage Vg becomes small. Then, when the gap voltage Vg reaches the breakdown voltage Vb (at point A2), an electric charge is released from the charging member to the member to be charged (discharging phenomenon). As a result, the surface potential of the member to be charged becomes Vc. Then, as the gap distance g decreases, the discharging phenomenon continues along the Paschen's curve 131, and reaches point A3. Point A3 is a point at which the gap voltage Vg no longer exceeds the breakdown voltage Vb even if the gap distance g becomes smaller than that, and the discharging phenomenon ends here. Consequently, the charging process also ends, and the member to be charged is thus charged to the surface potential Vs.

Here, in a region where the gap distance g is greater than 8 (μm), the breakdown voltage Vb (i.e., the curve 131) is expressed by the following formula:

$$Vb=-312-6.2\ g \quad (1)$$

In addition, if the thickness of the photosensitive layer is assumed to be $d_{pc}$ and the dielectric constant of the photosensitive layer is assumed to be $\epsilon_{pc}$, the gap voltage Vg (i.e., the curve 132) is expressed by $$Vg=(Va-Vc)\cdot g/\{(d_{pc}/\epsilon_{pc})+g\} \quad (2)$$

It should be noted that Va is the voltage applied to the charging member, and Vc is the surface potential of the member to be charged prior to or during the charging process.

Here, the thickness $d_{pc}$=20 (μm) of the photosensitive layer used in the experiment and the dielectric constant $\epsilon_{pc}$=3.3 of the photosensitive layer are substituted in Formula (2), and (Va−Vs) and g at point A3 where the discharging phenomenon is completed are determined (Vc is rewritten as Vs in Formula (2) since the surface potential of the member to be charged at the time of the completion of the discharging phenomenon is Vs). Assuming that Vb=Vg, and Va−Vs=Vth, if conditions in which the curve 131 contacts the curve 132 (i.e., conditions in which the quadratic equation concerning g has a double solution) are determined, we have $$Vth=-565\ (V)$$

$$g=.4\ (\mu m)$$

The value of this Vth agrees with the threshold value shown in FIG. 2.

From the above results, it was possible to ascertain that the charging process of the charger in accordance with the present invention is due to the phenomenon of discharge at the gap (discharging gap) between the charging member and the member to be charged.

Next, an estimation will be made of the extent of the region of the discharging gap.

For instance, in an example in which the surface potential Vs of the member to be charged is charged to −700 (V), if it is assumed that $$Va=Vs+Vth=-1265\ (V)$$

and if the gap distance for starting the discharge at point A2 is determined from Formulae (1) and (2), we have $g=146$ (μm)

From the above result, it can be seen that the charging process of the charger in accordance with the present invention is effected by making use of the discharging phenomenon in the region in which the gap distance between the charging member and the member to be charged ranges from about 150 (μm) to about 17 (μm). Accordingly, it becomes necessary to uniformly form over an entire charging area a zone in which the distance between the charging member and the surface of the photosensitive member is gradually narrowed and the gap distance becomes approximately 150 (μm) or less. The charger in accordance with the present invention is arranged to be capable of stably forming such a discharging gap between the charging member and the photosensitive member.

Hereafter, a description will be given of the reason for this with reference to FIG. 1.

As described above, in the charger of the present invention, the film 102 is brought into contact with the member 110 to be charged in the contact zone N, and assumes such a shape that the radius of curvature of the film 102 in the zone P2 located downstream of the zone N in the rotating direction of the member 110 to be charged becomes smaller than the radius of curvature of the film 102 in the upstream zone P1.

Here, the reason for forming the contact zone N is to form a stable discharging gap between the film 102 and the member 110 to be charged in front and in rear of the zone N. It is necessary for this zone N to be formed stably along the axial direction of the member to be charged (i.e., in an effective charging-width zone).

In the case of the charger of the present invention, the film 102 is brought into contact with the member 110 to be charged with a relatively weak mechanical contacting force, and forms the zone N. Then, when a voltage is supplied from the power supply 106, an electrostatic attracting force acts between the film 102 and the electrically conductive substrate 111 of the member 110 to be charged in the zone N. By means of this electrostatic attracting force, the film 102 in the zone N is brought into contact with the member 110 to be charged in such a manner as to follow the member 110 to be charged.

Here, if the force for forming the zone N is only a mechanical force, it is difficult to disperse that force in the axial direction of the member to be charged and to cause the film to follow the member to be charged satisfactorily. For example, in a case where an uneven surface is present on the member to be charged, the mechanical force is concentrated on protruding portions. Accordingly, although the film is brought into contact with the projecting portions and their vicinities of the member to be charged, portions of the zone in which the film is not brought into contact with the member to be charged occur in the other portions of the zone. Consequently, it is impossible to cause the film to follow the member to be charged in the axial direction thereof.

However, in the case where the film is brought into contact with the member to be charged with an electrostatic attracting force, even if an uneven surface is present on the member to be charged, the force acting on the film acts substantially equally on both protruding and recessed portions, so that it is possible to cause the film to follow the member to be charged in the axial direction thereof. As a result, it is possible to form a stable discharging gap. It should be noted that, in order to cause the film to follow the member to be charged in the axial direction by means of the electrostatic attracting force, the film is required to be flexible.

Next, a description will be given of the reason for forming the zone having a smaller radius of curvature the zone P2 located downstream of the zone N than in the zone P1.

First, since the zone P1 of the film 102 located upstream of the zone N is a zone having a large radius of curvature, the discharging gap formed between the same and the member to be charged becomes gradually narrower toward the zone N. In such a discharging gap, the discharge is started and continued stably, with the result that the surface potential of the member 110 to be charged can be constantly set to a stable value.

In addition, as described above, a force oriented toward the downstream side acts on the film 102 in the zone N owing to the rotation of the member 110 to be charged and/or the application of a voltage. The film tends to be deformed toward the downstream side by means of this force. However, if a zone having a smaller radius of curvature is formed in the zone P2 located downstream of the zone N, a force for preventing the deformation of the film 102 acts in the vicinity of the zone P2. Furthermore, the force oriented toward the downstream side becomes large in proportion to the area of the zone N. However, since the zone having a small radius of curvature is formed in the zone P2 located downstream of the zone N, the zone N can be provided with a necessary minimum area, so that the force itself oriented toward the downstream side can also be made small. As a result, the shape of the film does not change.

Figure 4:
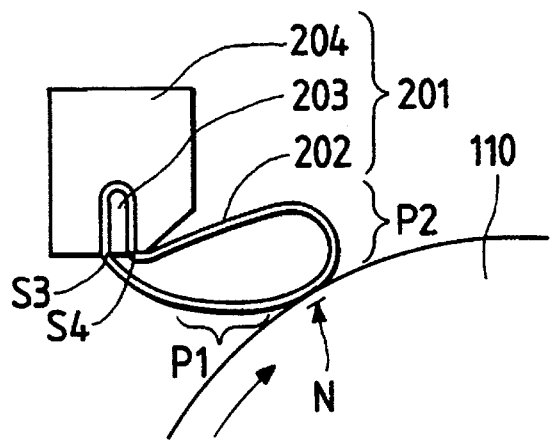
FIG. 4 is a schematic cross-sectional view illustrating another embodiment of the charger in accordance with the present invention.

In addition to the shape of the film shown in FIGS. 1(a) and 1(b), shown in FIGS. 4 to 6 are other examples of the shape which adopt an arrangement in which both ends of the film are supported, and produce a force for preventing the deformation of the film.

FIG. 4 is a schematic cross-sectional view illustrating another embodiment of the charger in accordance with the present invention.

In FIG. 4, the film constituting the charging member is replaced by a tube-shaped film. A support member 203 is inserted inside a tube-shaped film 202, and the film 202 together with the support member 203 is inserted in another support member 204, thereby forming a charging member 201. At this time, the film has fixed ends S3, S4. Then, an unsupported portion of the film 202 is brought into contact with the member 110 to be charged in such a manner as to be oriented toward the downstream side of the member 110 to be charged in the rotating direction thereof (in the direction of the arrow in the drawing). As shown in the drawing, the film 202 assumes a shape similar to that of a teardrop. The film 202 is brought into contact with the member 110 to be charged in the contact zone N, and the radius of curvature of the film 202 in the zone P2 located downstream of that zone N in the rotating direction of the member 110 to be charged is smaller than the radius of curvature of the film 202 in the upstream zone P1.

Here, if the tube-shaped film is used, it is possible to simplify the method in which the film is supported by the support member.

Figure 5A:
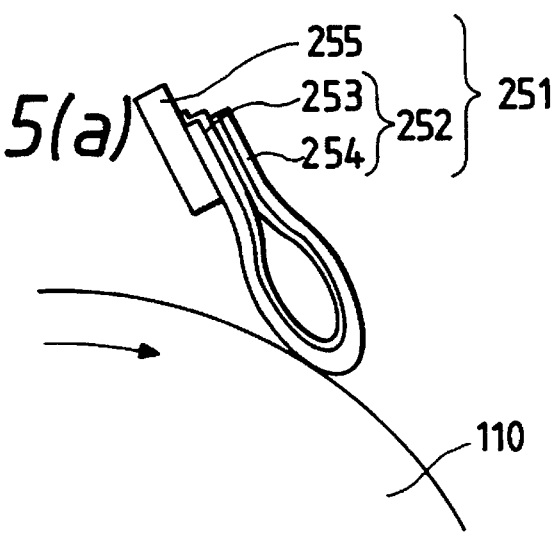
Figure 5B:
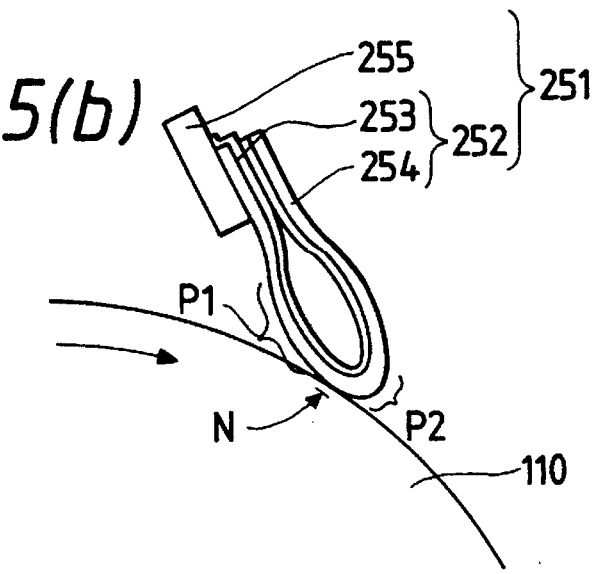

FIGS. 5(a) and 5(b) are schematic cross-sectional views illustrating still another embodiment of the charger in accordance with the present invention.

In FIGS. 5(a) and 5(b), the film constituting the charging member is replaced by a film of a multilayered structure. Furthermore, the distance between the fixed ends of the film is set to 0 (mm).

FIG. 5(a) is a diagram illustrating a nonoperative state. Both ends of a film 252 in which a resistance layer 254 is formed on an electrically conductive layer 253 are superposed on each other, and are bonded to a support member 255, thereby forming a charging member 251. The charger is arranged such that an unsupported portion of the film 252 is disposed in such a manner as to be oriented toward the downstream side of the member 110 to be charged in the rotating direction thereof (in the direction of the arrow in the drawing). It should be noted that the resistance layer 254 is formed on the surface of that side of the film 252 which contacts the member 110 to be charged.

In the nonoperative state, the film 252 is in a state of noncontact with the member 110 to be charged, or in a state in which it is in contact therewith but is not in firm contact therewith. Here, the state in which the film 252 is not in firm contact with the member 110 to be charged means a state in which the mechanical contacting force of the film is 10 (g/cm) or less.

FIG. 5(b) is a diagram illustrating an operative state. This is a state in which the member to be charged is rotated in the direction of the arrow, and a voltage is supplied from an unillustrated power supply.

Upon application of the voltage, the charge (electric current) moves in a path comprising the power supply, the support member 255, the electrically conductive layer 253 (movement in the planar direction), and the resistance layer 254 (movement in the thicknesswise direction). Then, an electrostatic attracting force is generated between the film 252 and the member 110 to be charged, so that the film 252 is brought into contact with the member 110 to be charged in the contact zone N. By means of this force, the film 252 is displaced very slightly toward the member 110 to be charged in a state in which its shape is maintained. Then, the film 252 is brought into pressure contact with the member 110 to be charged by following the same in the axial direction thereof. At that time, the film 252 exhibits a shape similar to that of a teardrop. The film 252 assumes a shape in which the radius of curvature of the film 252 in the zone P2 located downstream of zone N in the rotating direction of the member 110 to be charged becomes smaller than the radius of curvature of the film 252 in the upstream zone P1.

It should be noted that, in this case, although the film 252 is displaced very slightly during the starting of the operation or completion of the operation (when the voltage is turned on and off), the film 252 is not displaced during the operation, and the zone N is very stable. This is attributable to the fact that the shape of the film 252 is such that the radius of curvature of the film 252 in the zone P2 is smaller than the radius of curvature of the film 252 in the zone P1.

Figure 6A:
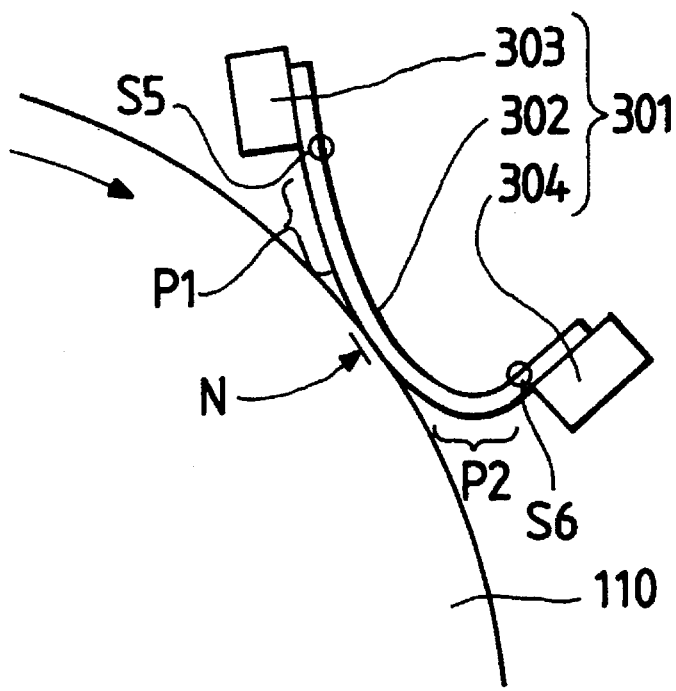
FIGS. 6(a) and 6(b) are schematic cross-sectional views illustrating further embodiments of the charger in accordance with the present invention.
Figure 6B:
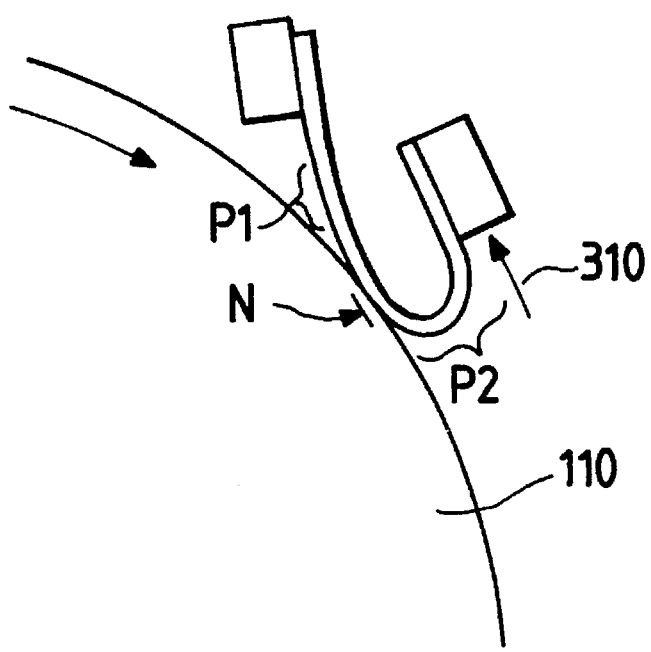

FIG. 6(a) and 6(b) are schematic cross-sectional views illustrating further embodiments of the charger in accordance with the present invention.

In FIG. 6(a), a method of supporting the film is changed. A charging member 301 shown in FIG. 6(a) is arranged such that both ends of a film 302 are supported by support members 303, 304 in such a manner as to form fixed ends S5, S6. When a voltage is supplied from an unillustrated power supply, an electrostatic attracting force is generated between the film 302 and the member 110 to be charged, and the film 302 is brought into contact with the member 110 to be charged in the zone N by means of this force. The film 302 from the fixed end S5, which is located upstream of the member 110 to be charged in the rotating direction (in the direction of the arrow in the drawing), to the zone N has the zone P1 of a substantially rectilinear shape. Meanwhile, the film 302 from the zone N to the downstream fixed end S6 has the zone P2 of a small radius of curvature. In this case as well, the arrangement provided is such that the radius of curvature of the zone P2 is smaller than the radius of curvature of the zone P1.

In FIG. 6(b), the support member 304 shown in FIG. 6(a) is moved in the direction of an arrow 310, such that the radius of curvature of the zone P2 located downstream of the zone N in the rotating direction of the member 110 to be charged (in the direction of the arrow in the drawing) is smaller than that in the case of FIG. 6(a).

The charger shown in FIG. 6(b) has a smaller radius of curvature of the zone P2 than the charger shown in FIG. 6(a). Accordingly, since the force for preventing the deformation of the film becomes greater, this arrangement is more desirable.

As other structures of the film constituting the charging member of the charger in accordance with the present invention, there are various variations including, for instance, a single-layered film (i.e., a film constituted only by a resistance layer), a two-layered film constituted by a resistance layer and a surface layer, and a multilayered film in which a conductive layer and a resistance layer are formed in that order on an insulating base.

The resistance layer is a layer in which a conductive substance is dispersed, and a layer formed of a conductive resin or a semiconductive resin. As the layer in which a conductive substance is dispersed, a substance in groups a), b) of substances listed below is dispersed or mutually dissolved in a resin selected from groups c)–f) of substances listed below, or in a substance having rubber elasticity selected from groups g)–j) of substances listed below, and is formed into a laminal shape. As the conductive resin, it is possible to cite a substance selected from the group b) of substances listed below. As the semiconductive resin, it is possible to cite a substance selected from the group c) of substances listed below.

The conductive layer plays the role of supplying the charge (current) from the support member of the charging member to the resistance layer at a portion which comes into contact with the member to be charged. Therefore, it suffices if the conductive layer has a lower resistance than the resistance layer. Examples of the conductive layer include a metallic vapor-deposited layer, a conductive-particles-dispersed layer, and a layer formed of a conductive resin. As the metallic vapor-deposited layer, it is possible to cite one in which metals or alloys of aluminum, indium, nickel, tin, copper, and the like are vapor-deposited in a laminal form. As the conductive-substance-dispersed layer, it is possible to cite one in which a substance in groups a), b) of substances listed below is dispersed or mutually dissolved in a resin selected from groups c)–f) of substances listed below, and is formed into a laminal shape. As the conductive resin, it is possible to cite a substance selected from the group b) of substances listed below.

The surface layer is a layer which is formed on the film surface which comes into contact with the member to be charged. The surface layer plays the roles of, among others, protecting the film from wear or the like, preventing the exudation of low-molecular-weight components from a layer underneath the protective layer, and enhancing the releasing properties of toner and the like. The surface layer consists of a substance selected from the groups c)–f) of substances listed below. Furthermore, it is possible to cite one in which a substance of the groups a), b) of substances listed below is dispersed or mutually dissolved in a resin selected from the groups c)–f) of substances listed below.

As the insulating base, it is possible to cite a resin selected from the groups d)–f) listed below.

It should be noted that, as for resistance values of the resistance layer and the surface layer, it is already known that even if their volume resistivities are specified, the volume resistivities do not correspond one-to-one with the resistance values during actual use. The reason for this is that the resistances of the resistance layer and the protective layer are current-dependent. The resistance value of the film is measured by a method which will be described later.

As for a method of preparing the film, the base is prepared first. Here, the base includes the insulating base, the conductive layer, and the resistance layer. Methods of preparing the base includes a method wherein the substance constituting the base is thermally melted, is dispersed or mutually dissolved, and is subjected to extrusion molding, thereby being molded into the form of film, or a method wherein the substance constituting the base is dissolved in a solvent, is dispersed or mutually dissolved, (is made to undergo polymerization), and is subjected to extrusion molding, thereby being molded into the form of film. As a method of forming the resistance layer and the protective layer on the base, there is a method wherein each substance is dissolved in a solvent, is dispersed or mutually dissolved, (is made to undergo polymerization), and is provided with dip coating or spray coating.

The following is a list of ten groups of substances applicable to the present invention:

a) Carbon blacks (e.g., furnace black, acetylene black, and carbon fillers), metallic oxide powders (e.g., ITO powder and $SnO_2$ powder), metal or alloy powders (e.g., Ag powder and Al powder), and salts (e.g., quaternary ammonium salt and perchlorate).
b) Electrically conductive resins such as polyvinyl aniline, polyvinyl pyrrole, polydiacetylene, polyethyleneimine, and the like.
c) Resins such as ethyl cellulose, nitrocellulose, methoxymethlated nylon, ethoxymethlated nylon, copolymer nylon, polyvinyl pyrrolidone, and casein, or a mixture of these resins.
d) Thermoplastic resins including acryl resins such as polyacrylate and polymethacrylate, styrene resins such as polystyrene and poly-1-methylstyrene, butyral resin, polyvinyl chloride, polyvinylidene chloride, polyvinyl fluoride, polyvinylidene fluoride, polyester resin, polycarbonate resin, cellulose resin, polyarylate resin, polyethylene resin, nylon resin, and polypropylene resin, or a copolymer or mixture thereof.
e) Water-soluble resins such as polyvinyl alcohol, polyaryl alcohol, polyvinyl pyrolidene, polyvinylamine, polyarylamine, polyvinyl acrylate, polyvinyl methacrylate, polyvinyl sulfuric acid, polylactic acid, casein, hydroxypropyl cellulose, starch, gum arabic, polyglutamic acid, polyspartic acid, and nylon resin, or a copolymer or mixture thereof.
f) Thermosetting resins such as epoxy resin, silicone resin, urethane resin, melamine resin, alkyd resin, polyimide resin, polyamide resin, and fluorine resin.
g) Natural rubber.
h) Synthetic rubbers such as silicone rubber, fluorine rubber, fluorosilicone rubber, urethane rubber, acryl rubber, hydrin rubber, epichlorohydrin rubber, butadiene rubber, styrene-butadiene rubber, nitrile-butadiene rubber, isoprene rubber, chloroprene rubber, isobutylene-isoprene rubber, ethylene-propylene rubber, chlorosulfonated polyethylene, and thiokol, or a mixture thereof.
i) Elastomer materials including styrol resin, vinyl chloride resin, polyurethane resin, polyethylene resin, methacrylate resin, and the like.
j) Soft foam materials such as polyurethane foam, polystyrene foam, polyethylene foam, elastomer foam, and rubber foam.

In addition, the voltage supplied to the charging member of the charger in accordance with the present invention is not limited to a dc voltage, and a voltage in which a dc voltage is superposed on an ac voltage may be used. Furthermore, instead of a voltage, a current may be supplied.

The support members play the roles of supporting the film and supplying a voltage (current) to the film. This being the case, however, not all the support members need to be formed of electrically conductive materials. For instance, in the case of FIGS. 1(a) and 1(b), only the support member 104 may be formed of an electrically conductive material, and the support members 103 and 105 may be formed of an insulating material.

Hereafter, on the basis of specific examples a detail description will be given of the properties of the charging member necessary for obtaining the above-described arrangement.

SPECIFIC EXAMPLE 1

As Specific Example 1, a description will be given of the results of investigating the relationship between the cross-sectional shape of the film and the charging performance. It should be noted that, as for the charging performance, the charger was mounted on an image forming apparatus, a 2×2 pattern with a resolution of 600 (dpi= dots per inch) was formed on recording paper of an A4 size, and the state of uneven charging was examined from the appearance of images on the recording paper. Furthermore, the state of the charger during the operation and nonoperation of the image forming apparatus was observed.

First, a description will be given of the image forming apparatus used in the experiment.

Figure 7:
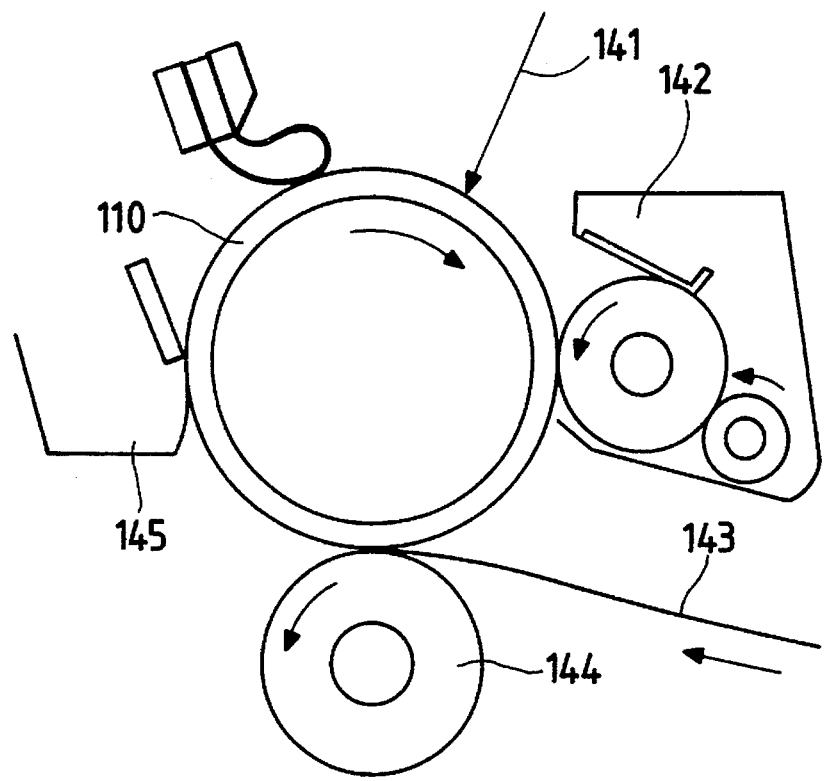
FIG. 7 is a schematic cross-sectional view of an image forming apparatus with the charger in accordance with the present invention mounted thereon.

FIG. 7 is a schematic cross-sectional view of the image forming apparatus used in the experiment, and an example is shown in which the charger shown in FIG. 1 is mounted as the charger.

The member 110 to be charged has an outside diameter of 30 (mm$\phi$), in which an undercoating layer (oxidation laminal layer) and a photosensitive layer (a photosensitive layer of a negative-charging-function separated type, a photosensitive layer thickness of 20 ($\mu$m) and a dielectric constant of 3.3), all formed in that order on a cylindrical conductive substrate (aluminum pipe). The member 110 starts rotating in the direction of the arrow by an unillustrated transporting means at a rotational speed of 30 (mm/s) upon receiving an image-formation start signal (an operation start). A voltage of Va=−1.17 (kV) is supplied (energization) from the power supply 106 to the support member 104 of the charging member 102. Then, in the discharging gap located upstream of the zone N, the charge moves from the film 102 to the member 110 to be charged (discharging phenomenon), thereby charging the surface of the member 110 to be charged to a potential Vs≈−600 (V). It should be noted that the effective charging width was set to 220 (mm).

Subsequently, a latent image of 600 (dpi) is formed on the member 110 to be charged by means of light 141 emitted from an unillustrated latent-image forming device. Here, the latent image which is formed has a 2×2 pattern. It should be noted that the 2×2 pattern means such a pattern that, in a square of 4 dots×4 dots of 600 (dpi), a square of 2 dots×2 dots is exposed. This latent image is subjected to reversal development by means of a developing device 142. It should be noted that the developing device 142 comprises a developing roller, a feed roller held in sliding contact with an outer periphery thereof, a resilient blade shaped like a thin leaf spring formed of a metal or a resin, and a toner. The toner fed to the developing roller by the feed roller is formed into a thin layer by the resilient blade, and is transported to a developing area where the member 110 to be charged and the developing roller are brought into pressure contact with each other. The toner is negatively charged in that process. Then, the toner is selectively developed at exposing portions of the member 110 to be charged by means of a developing electric field which is formed by the potential contrast (latent image) of the member 110 to be charged and the developing power supply (not shown). The toner developed on the member 110 to be charged is transferred by a transferring device 144 to recording paper 143 of an A4 size which moves in the direction of the arrow. It should be noted that the transferring device 144 is principally comprised of a transfer roller which is rotatively driven at substantially the same speed as the member 110 to be charged. As a voltage of an opposite polarity to the charging polarity of the toner is supplied to the transfer roller, the toner on the member 110 to be charged is electrostatically transferred onto the recording paper 143. Then, the toner is fixed on the recording paper by means of an unillustrated fixing means.

The toner remaining on the member 110 to be charged after the transfer is removed by a cleaning device 145. The cleaning device is principally comprised of a cleaning blade which is brought into contact with the member 110 to be charged, and removes the toner remaining on the member 110 to be charged by means of its mechanical contacting force. The member 110 to be charged is then charged by the charger.

An image is formed on the recording paper in the above-described manner.

Figure 8:
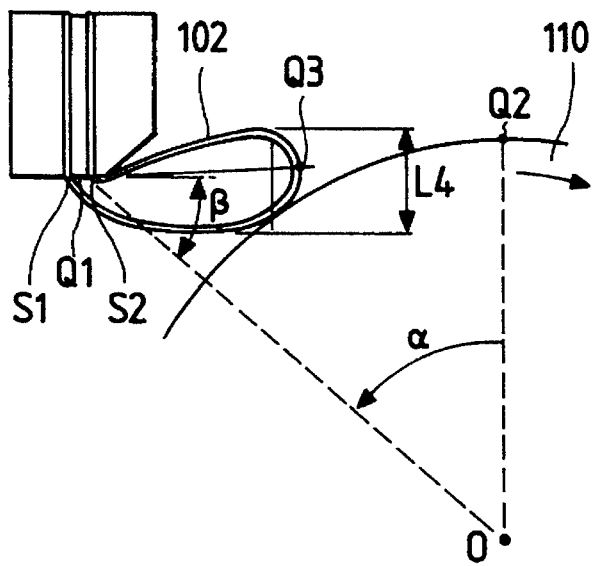
FIG. 8 is a diagram for explaining parameters for mounting the charging member of the charger in accordance with the present invention.

Referring now to FIG. 8, a description will be given of the chargers used in the experiment. It should be noted that FIG. 8 is a diagram for explaining parameters for mounting the charging member and is basically equivalent to FIG. 1 (b).

Chargers 1 to 3 shown in Table 1 were prepared. It should be noted that the film was formed by melting and mixing the following:

|  |  |
|---|---|
| nylon resin | 90 (wt %) |
| furnace black | 10 (wt %) | and, subsequently, by extruding the mixture by a film forming machine into a thickness of 50 (μm). The Young's modulus of the film after formation was 50 (kg/mm$^2$) when measured in accordance with JIS (Japanese Industrial Standard) K7127.

Here, the distance between the fixed end S1 and the fixed end S2 was set as L1 (mm) (not shown); the length of the film 102 from the fixed end S1 to the fixed end S2 was set as L2 (mm) (not shown); an intermediate point between the fixed end S1 and the fixed end S2 was set as a point Q1; the center of the member to be charged was set as a point O; an apex of the member 110 to be charged was set as a point Q2; the distance of a segment OQ1 was set as L3 (mm) (not shown); using the segment OQ2 as a reference and the rotating direction of the member to be charged as a positive direction, ∠Q1OQ2 was set as α (°); and ∠S2Q1O as β (°). Furthermore, a farthest point from the point Q1 on the curve of the film 102 was set as a point Q3, while a length which gives a maximum distance of the film 102 in a direction perpendicular to the segment Q1Q3 was set as L4 (mm).

Detailed set conditions in the chargers 1 to 3 are shown in Table 1.

TABLE 1

| Charger | L1 (mm) | L2 (mm) | L3 (mm) | L4 (mm) | α (°) | β (°) |
|---|---|---|---|---|---|---|
| 1 | 0.0 | 9.0 | 18.0 | 2.2 | −20 | 110 |
| 2 | 0.0 | 9.0 | 18.0 | 2.2 | −20 | 70 |
| 3 | 1.0 | 10.0 | 18.0 | 2.5 | −20 | 70 |

First, the states of the chargers 1 to 3 during the operation and nonoperation were observed.

Figure 9A:
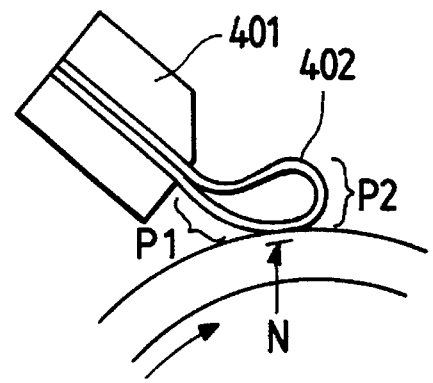
FIGS. 9(a) to 9(c) are schematic cross-sectional views illustrating the states of operation of the charger in accordance with the present invention.
Figure 9B:
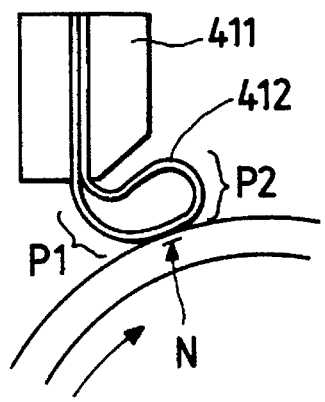
Figure 9C:
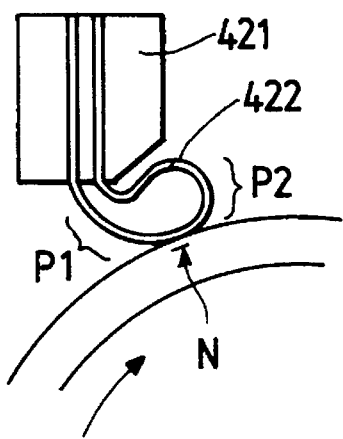

The states of the chargers 1 to 3 during the operation are shown in FIGS. 9(a) to 9(c) of FIG. 9. In the respective drawings, the charging members correspond to numerals 401, 411, and 421, while the films correspond to 402, 412, and 422.

The contact zone (nip) N between the film and the member to be charged during the operation was 0.4 (mm) for all of the chargers 1 to 3. A uniform nip area was found to have been formed in the axial direction of the member to be charged. The radius of curvature of the zone P2 of the film during the operation was 0.5 (mm) or thereabouts for all of the chargers 1 to 3, while the radius of curvature of the zone P1 was generally 4 (mm), 3 (mm), and 3 (mm), respectively. In addition, the shape of the film during the operation of the chargers 1 to 3 and the shape of the film during the nonoperation were similar, and maintained a shape similar to that of a teardrop. In addition, the size of zone N was also similar (therefore, the state during the nonoperation is not shown in the drawing). Furthermore, the shape of the film and the zone N during the operation were constantly stable. The reason for this was attributable to the fact that a zone having a small radius of curvature (generally, a radius of curvature of 0.5 (mm)) was formed in the zone P2, as described above, and that the zone N was small at 0.4 (mm).

It should be noted that the shape of the film similar to that of a teardrop can be obtained by allowing the film to be supported by the support members such that L1<L4.

Next, a 2×2 image was formed.

The chargers 1 to 3 were able to form satisfactory and uniform images. The reason for this was as follows: Since the zone P1 is a zone having a large radius of curvature, the discharging gap formed with respect to the member to be charged becomes gradually small toward the zone N. Then, since the shape of the film does not change, as described above, this discharging gap exists in a stable manner. Accordingly, the discharge was stably started and continued, with the result that it was possible to effect uniform charging. Hence, the 2×2 images also became uniform images.

Next, forces acting between the films and the member to be charged in the chargers 1 to 3 were measured.

In the measurement, a string having one end attached to a spring balance was wound around the periphery of the member to be charged, and a force occurring in the spring balance when the string was pulled at a rate of 30 (mm/s) was measured. A value obtained by dividing that measured value by a coefficient of dynamic friction was set as the force acting between the film and the member to be charged. Incidentally, the measurement was conducted both when the voltage was not applied to the charging member (a mechanical contacting force of the film with respect to the member to be charged during the nonoperation) and when the voltage was applied. The coefficient of dynamic friction was measured in accordance with JIS K7125. As a result, the coefficient of dynamic friction was 0.3.

The results are shown in Table 2.

TABLE 2

|  | Mechanical contacting force (g/cm) | Contacting force during operation (g/cm) |
|---|---|---|
| Charger 1 | 2.0 | 5.2 |
| Charger 2 | 3.1 | 6.4 |
| Charger 3 | 3.0 | 6.2 |

As shown in Table 2, the mechanical contacting force was weak in all of the chargers 1 to 3, and the contacting force during the operation was also relatively weak. During the operation, however, an electrostatic attracting force acts, as described before. The film follows the member to be charged in the axial direction thereof by means of this electrostatic attracting force.

In a case where the film is brought into contact with the member to be charged by the electrostatic attracting force as in the present invention, even if there is an uneven surface in the member to be charged, the force acting in the film is substantially equal for both protruding portions and recessed portions. Furthermore, that force is not concentrated locally. Accordingly, the film can be made to follow the member to be charged in the axial direction with a relatively weak force. Consequently, a stable discharging gap can be formed.

Furthermore, in the charger of the present invention, the contacting force of the charging member with respect to the member to be charged is weak. For that reason, the member to be charged and the charging member are prevented from becoming frictionally deteriorated. Moreover, foreign objects such as the toner, toner additives, paper dust, and the like which have passed through the cleaning blade are allowed to flow to the downstream side of the zone N. Thus, an excess amount of the foreign substances are prevented from being remaining on the upstream side of the zone N. Accordingly, it is possible to effect a stable and uniform charging process over extended periods of time.

Furthermore, the contacting force of the charging member with respect to the member to be charged is weaker during the nonoperation. Therefore, it is preferable to apply the voltage after the start of rotation of the member to be charged, or to stop the rotation of the member to be charged after the supply of the voltage is stopped, since the foreign substances remaining in the vicinity of the zone N are allowed to flow more effectively to the downstream side of the zone N. Alternatively, a similar effect can be obtained if the voltage supplied to the charging member is interrupted temporarily.

SPECIFIC EXAMPLE 2

As Specific Example 2, conditions for producing a force for preventing the deformation of the film were examined by taking note of the bending moment of the film. In the case where the zone P2 having a small radius of curvature was formed on the downstream side of the zone N as described above, an examination was conducted as to whether or not there is a relationship between the bending moment of the zone P2 and the force for preventing the deformation of the film.

An experiment was conducted on the basis of the charger 2 shown in Specific Example 1 without changing the manner in which the charging member was mounted, but by changing the film material to those shown in Table 3. An evaluation was made in the same way as in Specific Example 1.

It should be noted that the values of the charger 2 are also listed in Table 3.

Here, a description will be given of the bending moment of the film.

If the Young's modulus of the film is set as E (kg/mm$^2$), the thickness is set as t (mm), the effective charging width is set as w (mm), and the radius of curvature is set as ρ (mm), then the moment of inertia of area I (mm$^4$) and the bending moment M (kg·mm) are expressed as $$I = w \cdot t^3/12$$

$$M = E \cdot I/\rho = w \cdot t^3 \cdot E/(12 \cdot \rho)$$

In the calculation shown in Table 3, from the results of Specific Example 1, a setting was provided such that ρ= 0.5 (mm), and w=220 (mm).

TABLE 3

| Charger | Film Material | E (kg/mm$^2$) | t (mm) | Et$^3$ (kg · mm) | M (kg · mm) |
|---|---|---|---|---|---|
| 2 | nylon + furnace black | 50 | 0.050 | 0.0063 | 0.23 |
| 4 | polyethylene + furnace black | 200 | 0.050 | 0.025 | 0.92 |
| 5 | nylon + acetylene black | 50 | 0.045 | 0.0046 | 0.16 |
| 6 | polyethylene + furnace black | 200 | 0.025 | 0.0031 | 0.11 |
| 7 | nylon + acetylene black | 50 | 0.030 | 0.0014 | 0.050 |
| 8 | olefin + furnace black | 5 | 0.050 | 0.00063 | 0.023 |
| 9 | nylon + acetylene black | 50 | 0.020 | 0.00040 | 0.015 |
| 10 | olefin + acetylene black | 5 | 0.022 | 0.000053 | 0.0020 |
| 11 | olefin + ketene black | 5 | 0.020 | 0.000040 | 0.0015 |

The states of chargers 4 to 11 during the operation and nonoperation were observed.

In the chargers 4 to 10, the shape of the film during the nonoperation and the shape of the film during the operation were similar. Furthermore, the shape of the film and the zone N during the operation were constantly stable.

In the charger 11, during the start of operation the film deformed very slightly in such a manner as to be pulled toward the downstream side in the rotating direction of the member to be charged. Then, the zone N vibrated very slightly during the operation. However, the shape of the film remained stable during the operation.

Next, a 2×2 image was formed.

As for the chargers 4 to 10, it was possible to form satisfactory and uniform 2×2 images. In the charger 11, discontinuous low-density portions extending longitudinally in fine streaks occurred very rarely, but they were of such a measure as to present no problems in practical use.

From the results, it was found that a desirable range of the bending moment of the film is 0.002 (kg·mm) or above, whereby the force for preventing the deformation of the film can be produced. Accordingly, it is possible to stably maintain the zone P1 located upstream of the zone N.

SPECIFIC EXAMPLE 3

As Specific Example 3, conditions for properly forming the zone N over the axial direction of the member to be charged were investigated by taking note of the flexural rigidity of the film. In other words, the flexibility required of the film was examined.

The experiment was conducted on the basis of the charger shown in FIGS. 5(a) and 5(b). Chargers 12 to 21 shown below were prepared without changing the manner in which the charging member was mounted, but by changing the material of the film. Table 4 shows the manner in which the charging member was mounted in accordance with specific Example 1. An evaluation was made in the same way as in Specific Example 1.

TABLE 4

| L1 (mm) | L2 (mm) | L3 (min) | L4 (mm) | α (°) | β (°) |
|---|---|---|---|---|---|
| 0.0 | 9.0 | 15.7 | 2.2 | 25 | 15 |

Charger 12

The film used was arranged as follows: A resistance layer made of 0.04-(mm)-thick polyurethane with lithium perchlorate mutually dissolved therein was formed, and an electrically conductive layer made of a 0.005-(mm)-thick polyethylene resin having carbon black dispersed therein was formed on a rear surface of the resistance layer. It should be noted that the resistance of the conductive layer was made sufficiently low with respect to the resistance layer. The resistance value of the charging member was $R=4\times10^6$ ($\Omega$).

Charger 13

The film used was arranged as follows: A resistance layer made of 0.07-(mm)-thick polyurethane with carbon black dispersed therein was formed, and an electrically conductive layer made of a 0.005-(mm)-thick polyethylene resin having carbon black dispersed therein was formed on a rear surface of the resistance layer. Further, a 0.01-(mm)-thick surface layer made of N-methoxymethlated nylon with citric acid compounded therewith as a crosslinking agent was formed on the surface of the resistance layer (on a side which is not provided with the conductive layer). It should be noted that the resistance of the conductive layer was made sufficiently low with respect to the resistance layer. The resistance value of the charging member was $R=1\times10^7$ ($\Omega$).

Charger 14

The film used was arranged as follows: A resistance layer made of a 0.04-(mm)-thick conductive polyurethane resin with carbon black dispersed therein was formed, and an electrically conductive layer made of a 0.005-(mm)-thick polyethylene resin having carbon black dispersed therein was formed on a rear surface of the resistance layer. It should be noted that the resistance of the conductive layer was made sufficiently low with respect to the resistance layer. The resistance value of the charging member was $R=8\times10^6$ ($\Omega$).

Charger 15

A film was used in which was formed a resistance layer made of a 0.040-(mm)-thick conductive polyurethane resin with carbon black dispersed therein. The resistance value of the charging member was $R=1\times10^7$ ($\Omega$).

Charger 16

A film was used in which a 0.010-(mm)-thick resistance layer made of an N-methoxymethlated nylon layer with melamine compounded therewith as a crosslinking agent was formed on a 0.025-(mm)-thick polyester base. The resistance value of the charging member was $R=2\times10^7$ ($\Omega$).

Charger 17

A film was used in which a 0.01-(mm)-thick surface layer made of N-methoxymethlated nylon with polypyrrole compounded therewith was formed on a resistance layer (a resilient resistance layer) made of a 0.1-(mm)-thick epichlorohydrin-ethylene oxide copolymer rubber with carbon black dispersed therein. It should be noted that the resistance of the conductive layer was made low with respect to the resistance layer. The resistance value of the charging member was $R=2\times10^7$ ($\Omega$).

Charger 18

A film was used in which a 0.01-(mm)-thick surface layer made of N-methoxymethlated nylon with polypyrrole compounded therewith was formed on a resistance layer (a resilient resistance layer) made of a 0.44-(mm)-thick epichlorohydrin-ethylene oxide copolymer rubber with carbon black dispersed therein. It should be noted that the resistance of the conductive layer was made low with respect to the resistance layer. The resistance value of the charging member was $R=2\times10^7$ ($\Omega$).

Charger 19

A film was used in which a polyester resin formed into a thickness of 0.09 (mm) with furnace black dispersed therein was formed as a resistance layer. The resistance value of the charging member was $R=1\times10^7$ ($\Omega$).

Charger 20 (Comparative Example)

The film used was arranged as follows: A conductive layer made of a 0.005-(mm)-thick polyethylene resin with carbon black dispersed therein was formed on a 0.075-(mm)-thick polyester base, and a 0.02-(mm)-thick resistance layer made of N-methoxymethlated nylon with citric acid compounded therewith as a crosslinking agent was formed thereon. It should be noted that the resistance of the conductive layer was made sufficiently low with respect to the resistance layer. The resistance value of the charging member was $R=1\times10^7$ ($\Omega$).

Charger 21 (Comparative Example)

A film was used in which a 0.1-(mm)-thick surface layer made of N-methoxymethlated nylon with polypyrrole compounded therewith was formed on a resistance layer (a resilient resistance layer) made of a 0.6-(mm)-thick epichlorohydrin-ethylene oxide copolymer rubber with carbon black dispersed therein. It should be noted that the resistance of the conductive layer was made low with respect to the resistance layer. The resistance value of the charging member was $R=2\times10^7$ ($\Omega$).

Here, a description will be given of the flexural rigidity of the film.

If the Young's modulus of the film is set as E (kg/mm²), the thickness is set as t (mm), and the effective charging width is set as w (mm), the moment of inertia of area I (mm⁴) and the flexural rigidity B (kg·mm²) are expressed as $$I = w \cdot t^3/12$$

$$B = E \cdot I = w \cdot t^3 \cdot E/12$$

In the calculation shown in Table 5, a setting was provided such that w=225 (mm). It should be noted that the Young's modulus E shown in Table 5 was measured in accordance with JIS K7127.

TABLE 5

| Charger | E (kg/mm²) | Et³ (kg · mm) | B (kg · mm²) |
|---|---|---|---|
| 12 | 10 | 0.00091 | 0.017 |
| 13 | 10 | 0.0061 | 0.12 |
| 14 | 200 | 0.018 | 0.34 |
| 15 | 200 | 0.013 | 0.24 |
| 16 | 500 | 0.021 | 0.40 |
| 17 | 1 | 0.0013 | 0.025 |
| 18 | 0.8 | 0.073 | 1.4 |
| 19 | 280 | 0.20 | 3.8 |
| 20 (Comparative Example) | 500 | 0.50 | 9.4 |
| 21 (Comparative Example) | 0.7 | 0.24 | 4.5 |

The states of chargers 12 to 21 during the operation and nonoperation were observed. In all the chargers, the shape of the film during the nonoperation and the shape of the film during the operation were similar. Furthermore, the shape of the film and the zone N during the operation were constantly stable.

Next, a 2×2 image was formed. As for the chargers 12 to 19, it was possible to form satisfactory and uniform 2×2 images. With respect to the chargers 20 and 21, however, low-density portions extending longitudinally in fine streaks and high-density portions extending longitudinally occurred, and it was impossible to obtain uniform images (i.e., charging). They were of such a measure as to present a problem in practical use.

Conceivably, this was attributable to the fact, in the case of the chargers 12 to 19, the film in the zone N came into contact with the member to be charged during the operation in such a manner as to follow the same by the electrostatic attracting force acting between the film and the conductive substrate of the member to be charged. In the case of the chargers 20 and 21, however, since the film was rigid (since the flexural rigidity was large), the film could not be brought into contact with the member to be charged by the electrostatic attracting force, thereby making it impossible to the film to satisfactorily follow the member to be charged in the axial direction thereof. Consequently, a stable discharging gap could not be formed, so that uneven charging occurred.

From the above-described results, it was found that 3.8 (kg·mm²) or less is necessary as the flexural rigidity of the film.

Furthermore, if it is assumed that

M: bending moment of the film

B: flexural rigidity of the film w: effective charging width (mm)

t: film thickness (mm)

E: Young's modulus (kg/mm²) of the film

ρ: radius of curvature of the film on the downstream side of the contact area between the film and the member to be charged then the results of Specific Examples 2 and 3 become $$M = w \cdot t^3 \cdot E/(12 \cdot \rho) \geq .002 \text{ (kg·mm)} \quad (3)$$

$$B = w \cdot t^3 \cdot E/12 \leq 3.8 \text{ (kg·mm}^2\text{)} \quad (4)$$

From the inequalities (3) and (4), the following relation is derived:

$$.024 \cdot \rho \leq w \cdot t^3 \cdot E \leq .6 \quad (5)$$

Here, if it is assumed that w=220 (mm), ρ=.5 (mm)

then the inequality (5) can be rewritten as $$.00005 \leq t^3 \cdot E \leq .21 \quad (6)$$

Accordingly, it is preferred that the film of the charging member of the charger in accordance with the present invention be a film which satisfies the inequality (6). As the material of the film, it is preferable to use nylon resins, polyethylene resins, olefin resins, polyester resins, polyurethane resins, epichlorohydrin-ethylene oxide copolymer rubbers, and the like. In particular, nylon resins, polyethylene resins, and polyester resins are preferable.

SPECIFIC EXAMPLE 4

In Specific Example 4, an example is shown in which the mechanical contacting force of the film with respect to the member to be charged is set to 0 (g/cm).

Figure 10A:
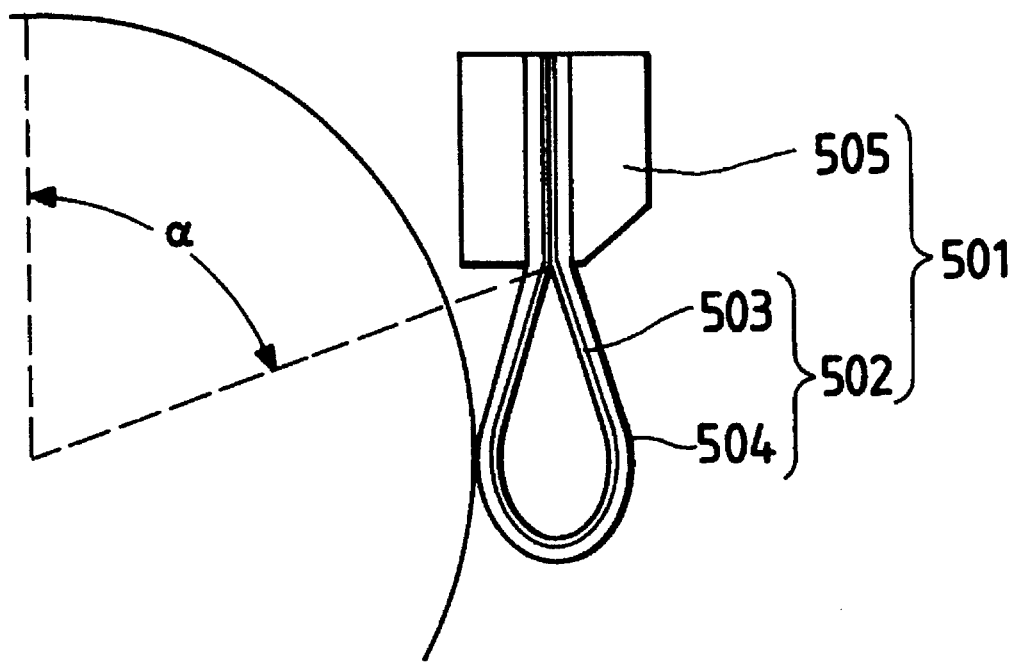
FIGS. 10(a) and 10(b) are schematic cross-sectional views illustrating a further embodiment of the charger in accordance with the present invention.
Figure 10B:
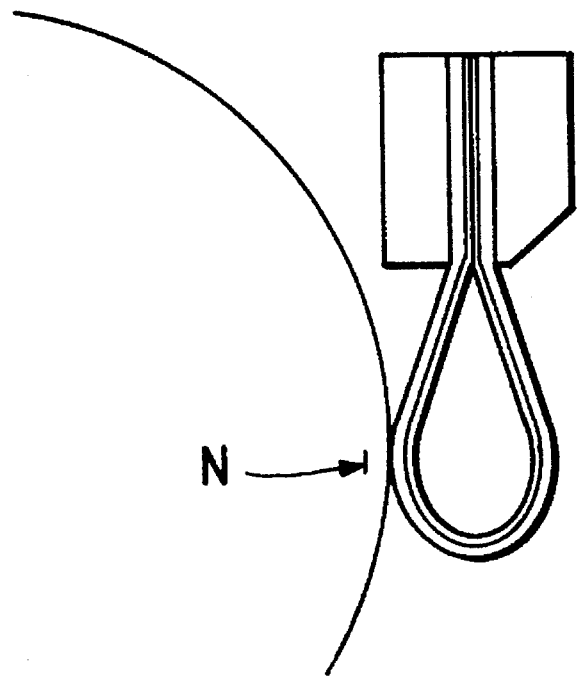

FIGS. 10(a) and 10(b) are schematic cross-sectional views illustrating a further embodiment of the charger in accordance with the present invention.

FIG. 10(a) is a diagram illustrating the state during the nonoperation. Both ends of a film 502 in which a resistance layer 504 is formed on a conductive layer 503 are superposed on top of the other, and bonded to a support member 505, thereby forming a charging member 501. The charging member 501 is placed in such a manner that α becomes approximately 70 (°), and β becomes approximately 160 (°). If the charging member 501 is set in this manner, in the state of the nonoperation a very small gap is formed between the film 502 and the member 110 to be charged.

FIG. 10(b) is a diagram illustrating the state during the operation. This is a state in which the member to be charged is rotated in the direction of the arrow, and a voltage is supplied from an unillustrated power supply.

In FIG. 10(a), as the voltage is applied from the unillustrated power supply, the charge (electric current) moves in a path comprising the power supply, the support member 505, the electrically conductive layer 503 (movement in the planar direction), and the resistance layer 504 (movement in the thicknesswise direction). Then, an electrostatic attracting force is generated between the film 502 and the member 110 to be charged, so that the film 502 is brought into contact with the member 110 to be charged in the contact zone N. By means of this force, the film 502 is displaced very slightly toward the member 110 to be charged in a state in which its shape is maintained. Then, the film 502 is brought into pressure contact with the member 110 to be charged by following the same in the axial direction thereof. The film 502 assumes a shape in which the radius of curvature of the film 502 in the zone P2 located downstream of that zone N in the rotating direction of the member 110 to be charged becomes smaller than the radius of curvature of the film 502 in the upstream zone P1.

In the charger which is arranged as described above, the film 502 is brought into contact with or away from the member 110 to be charged during the operation and nonoperation. The contacting force of the film 502 with respect to the member to be charged, when measured, was 0 (g/cm) during the nonoperation and 2.4 (g/cm) during the operation (incidentally, the coefficient of dynamic friction between the film 502 and the member 110 to be charged was 0.73).

It should be noted that, in this case, although the film 502 is displaced very slightly during the starting of the operation or completion of the operation (when the voltage is turned on and off), the film 502 is not displaced during the operation, and the zone N is very stable.

In the case where the film is brought into contact with the member to be charged by the electrostatic attracting force as in this embodiment, even if there is an uneven surface in the member to be charged, the force acting in the film is substantially equal for both protruding portions and recessed portions. Furthermore, that force is not concentrated locally. Accordingly, the film can be made to follow the member to be charged in the axial direction with a relatively weak force. Consequently, a stable discharging gap can be formed. In addition, the contacting force of the charging member with respect to the member to be charged is weak. For that reason, the member to be charged and the charging member are prevented from becoming frictionally deteriorated.

Furthermore, the contacting force of the charging member with respect to the member to be charged acts only during the application of the voltage. Therefore, by applying the voltage after the start of rotation of the member to be charged, or by stopping the rotation of the member to be charged after the supply of the voltage is stopped, it is possible to allow the foreign substances remaining in the vicinity of the zone N to flow to the downstream side of the zone N. As a result, foreign substances are prevented from remaining upstream of the zone N. Hence, it is possible to effect a stable and uniform charging process over extended periods of time.

SPECIFIC EXAMPLE 5

In Specific Example 5, an examination was conducted with respect to the resistance value R of the charging member.

On the basis of the charger 1 shown in Specific Example 1, the composition ratio of the film, the film thickness, and the effective charging width were changed without changing the manner in which the charging member was mounted. Here, the resistance value R of the charging member was changed by changing the composition ratio of the film (the composition ratio between the nylon resin and the electrically conductive agent). The film thickness was set to 45 ($\mu$m), and the effective charging width to 225 (mm).

The member to be charged was charged by means of charging members having different resistance values R so as to investigate the charging characteristics. It should be noted, however, that the resistance value R referred to in the present invention means a resistance at a time when a current necessary for charging is allowed to flow across the charging member. Furthermore, in the image forming apparatus shown in Specific Example 1, 2×2, solid white, and solid black images were formed, and the image quality was also examined.

Figure 11:
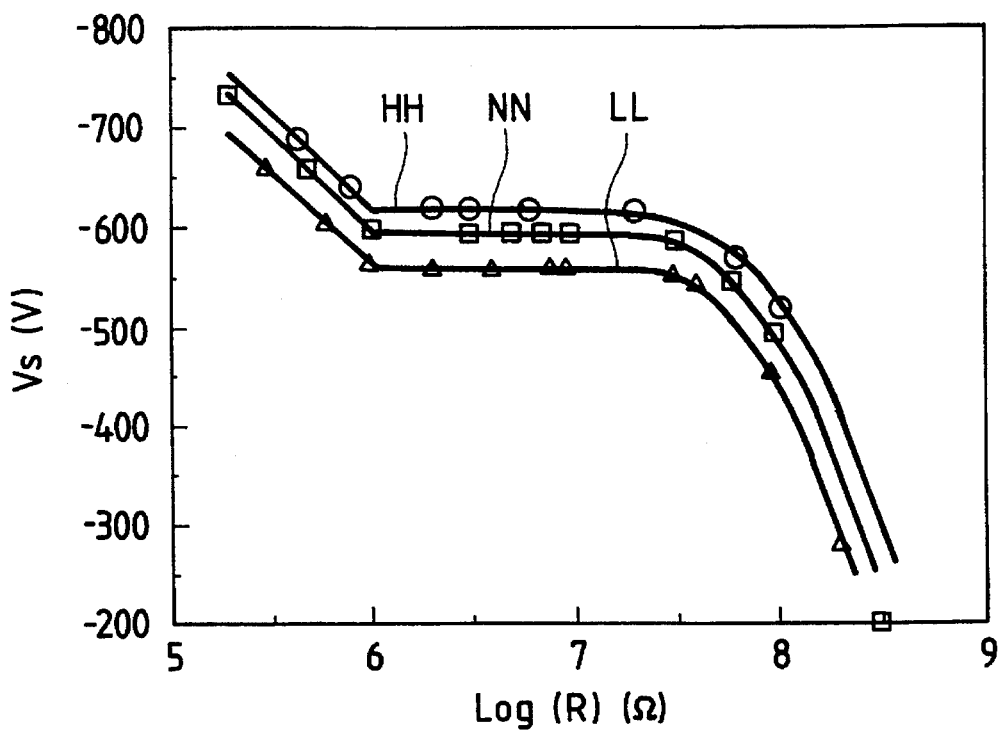
FIG. 11 is a diagram illustrating the relationship between the charging characteristics and the resistance value of the charging member of the charger in accordance with the present invention.

The relationship between the resistance value R of the charging member and the charging characteristics is shown in FIG. 11. In FIG. 11, the abscissa represents a logarithm value log (R) ($\Omega$) of the resistance value R of the charging member, while the ordinate represents an absolute value of the surface potential Vs of the member to be charged. Symbols in the drawing denote measured environments, wherein the mark $\square$ denotes an environment NN (20° C., 50% RH), the mark $\bigcirc$ denotes an environment HH (35° C., 65% RH), and the mark $\Delta$ denotes an environment LL (10° C., 15% RH).

As shown in FIG. 11, it can be seen that although the charging performance varies depending on the environment, in each of the environments there is a region where the surface potential Vs is independent of the resistance value R and becomes fixed. This region is the region where charging by means of the above-described Paschen's discharge takes place. This is a region where the resistance value R of the charging member is within the range of $10^6$ to $3\times10^7$ ($\Omega$).

Where the resistance value R is $10^6$ ($\Omega$) or less, charging by the Paschen's discharge and charging by the so-called charge injection take place. In other words, charging by the Paschen's discharge takes place in the discharging gap formed between the charging member and the member to be charged, and charging by the charge injection takes place in the zone N (nip). For this reason, the surface potential Vs of the member to be charged assumes a greater absolute value than the surface potential Vs in the case where the resistance value R of the charging member is in the range of $10^6$ to $3\times10^7$($\Omega$). Then, as the resistance value of the charging member decreases, the contribution of charging due to the charge injection becomes large, with the result that the absolute value of the surface potential Vs becomes even greater. For instance, if the resistance value R of the charging member drops by one digit, the absolute value of the surface potential Vs rises by 200 (V) or thereabouts.

Even where the resistance value R is $10^8$ ($\Omega$) or more, charging by the Paschen's discharge takes place. However, a phenomenon of so-called time-constant delay occurs in which the supply of a current necessary for charging lags behind, so that the charging efficiency declines. Therefore, the surface potential Vs of the member to be charged assumes a smaller absolute value than the surface potential Vs in a case where the resistance value R of the charging member is in the range of $10^6$ to $3\times10^7$ ($\Omega$). Then, as the resistance value R of the charging member increases, the decline in the charging efficiency becomes noticeable, with the result that the absolute value of the surface potential Vs becomes even smaller. For instance, if the resistance value of the charging member rises by one digit, the absolute value of the surface potential Vs drops by 400 (V) or more.

Figure 12:
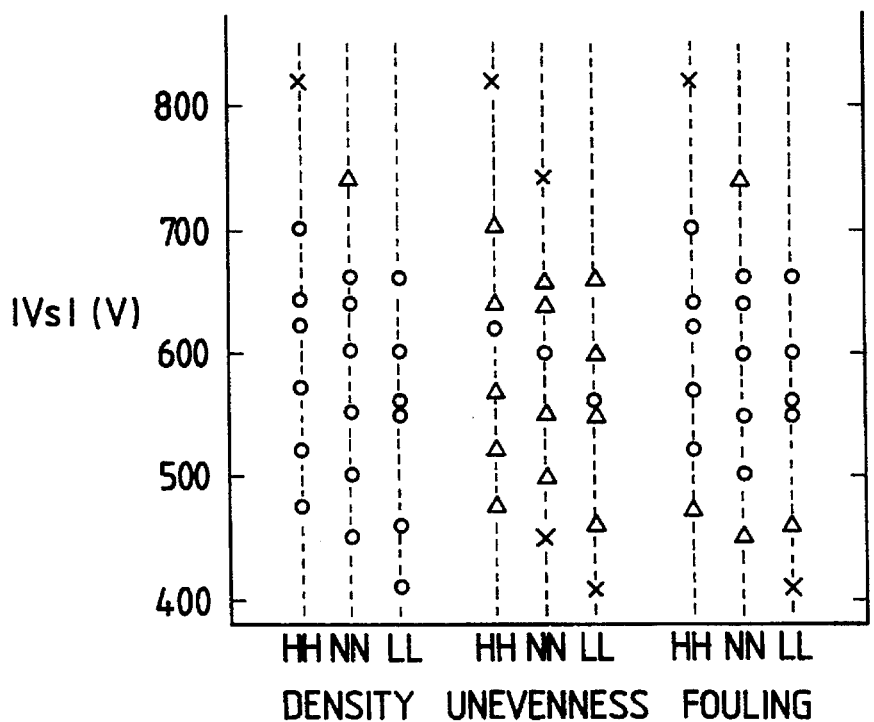
FIG. 12 is a diagram illustrating the relationship between the image quality of the surface potential of the member to be charged in the image forming apparatus with the charger in accordance with the present invention mounted thereon.

Next, FIG. 12 shows the relationship between the surface potential Vs and the image quality. In FIG. 12, the abscissa represents an absolute value of the surface potential Vs, while the ordinate represents items of image quality. It should be noted that, as for the image quality, the image density of solid black images, image unevenness of 2×2 images, and the extent of fouling of the white background of solid white images were evaluated. The marks $\bigcirc$, $\Delta$, and x plotted in the drawing respectively denote "satisfactory, or no unevenness or fouling is detected ($\bigcirc$)," "a level of presenting no problem in practical use ($\Delta$)," and "a lack of density, unevenness, or fouling is noticeable, and presents a problem in practical use (x)." In addition, the environment was used as a parameter in each item.

From FIG. 12, it can be seen that if the absolute value of the surface potential Vs becomes large, the extent of the decline in the image density, unevenness of the image, and the fouling of the white background deteriorates, and that the absolute value of the surface potential in which that extent presents no problem in practical use is 740 (V) or less. On the other hand, it can be seen that if the absolute value of the surface potential Vs becomes small, the extent of unevenness of the image and the fouling of the white background deteriorates, and that the absolute value of the surface potential in which that extent presents no problem in practical use is 450 (V) or above. In other words, it can be appreciated that the surface potential Vs necessary for securing the image quality is within the range of −740 to −450 (V). Furthermore, it can be seen that a preferable surface potential varies depending on the environment, −600 (V) in the environment NN, −620 (V) in the environment HH, and − 580 (V) in the environment LL.

If a preferable range of the resistance value of the charging member is determined by referring to FIG. 11, it is $3 \times 10^5$ to $1 \times 10^8$ ($\Omega$). More preferably, it is $1 \times 10^6$ to $3 \times 10^7$ ($\Omega$) which is the region in which the charging by the Paschen's discharge takes place. If the resistance value R of the charging member is within the above-described range, it is possible to secure the surface potential capable of ensuring the image quality.

Here, a description will be given of a method of measuring the resistance value R of the charging member.

In the charger shown in FIG. 1(b), except that the member to be charged is changed to an electrically conductive cylindrical electrode of the same configuration, all of the surface movement velocity of the cylindrical electrode, the pressing force of the charging member against the cylindrical electrode, and the like are set under the same charging conditions as the actual charging conditions. Then, the same current as the current necessary for charging the member to be charged to the predetermined surface potential Vs is allowed to flow across the charging member. By measuring the voltage applied between the charging member and the cylindrical electrode, the resistance value R of the charging member is determined. The most important point in this measuring method lies in that the resistance value of the charging member is determined by allowing the current necessary for charging to flow across the charging member.

It should be noted that the current necessary for charging can be obtained by determining the current value during the actual charging process, or by the following formula:

$$I = \epsilon_{pc} \cdot \epsilon_0 \cdot w \cdot vp \cdot Vs/d_{pc}$$

where I (A) is a current necessary for charging to the predetermined surface potential Vs (V), w (mm) is an effective charging width of the charging member, $d_{pc}$ (mm) is the thickness of the photosensitive layer of the member to be charged, $\epsilon_{pc}$ is a dielectric constant of the photosensitive layer of the member to be charged, vp (mm/sec) is the surface movement velocity of the member to be charged, and $\epsilon_0$ (F/mm) is the permittivity of a vacuum. Incidentally, in this embodiment, the current necessary for charging the photosensitive drum to the surface potential Vs=−600 (V) is I=−5.9 (μA).

As is apparent from the above, the resistance of the charging member in the present invention reflects the state of actual charging, and differs from a mere volume resistivity of the charging member.

To given a detailed description, the resistance value of the charging member is dependent upon the current (or voltage).

Generally, when the current changes, the resistance also changes. Furthermore, since the charging member is in contact with the member to be charged, the resistance of the charging member during actual charging includes electrical contact resistance, and is dependent upon the state of contact between the charging member and the member to be charged. For example, if the moving velocity of the member to be charged is changed, the resistance also changes. Hence, the resistance which is measured by allowing a current necessary for charging to flow across the charging member and by setting the state of contact between the charging member and the electrode as being identical to that in the case of the member to be charged reflects the state of actual charging.

It should be noted that the details described in Specific Example 5 are not details confined to the present invention, but are details that are generally applied to general chargers in which charging members are fixed and which charge the members to be charged. For instance, the details described in Specific Example 5 are applicable to a charger in which a charging member is formed by a deck-type brush, or a charger in which a charging member is formed by a blade.

EMBODIMENT 2

When the charging member was formed by changing the type of film, and image formation was performed, there were cases where streaky high-density portions (white streaks) occurred in images in parallel with the direction of travel of the paper. This was attributable to the fact that overcharged portions occurred for some reason or other.

Accordingly, when the film corresponding to the overcharged portions was observed, projections were present on the film surface in the vicinity of the zone N. A region including this projection was observed by a scanning laser microscope (made by Lasertech, 1LM21).

Figure 13:
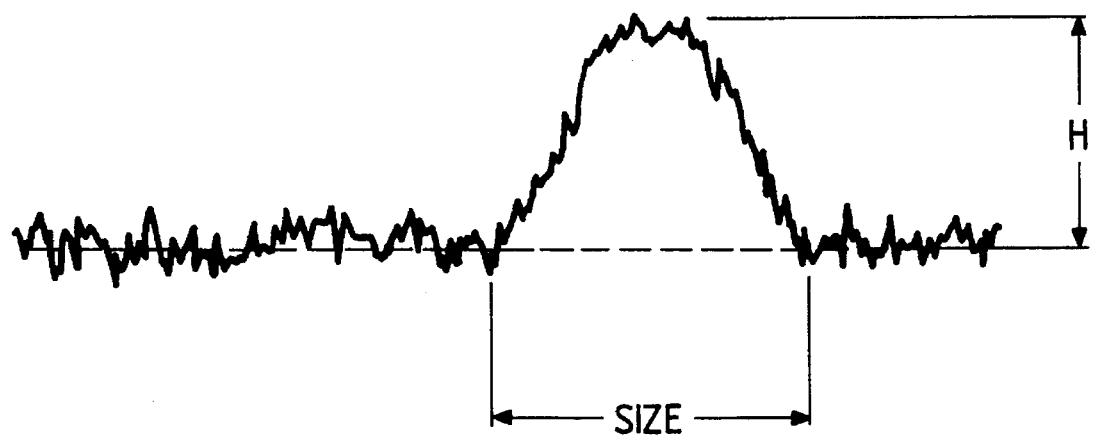
FIG. 13 is a diagram illustrating a cross-sectional profile of the film surface in which faulty charging occurred.

FIG. 13 shows a cross-sectional profile of the film. The solid line in the drawing shows the cross-sectional profile, and the broken line shows the center line. When the height and the size of the projection (specified as the height and the size in the drawing) was measured from the drawing, the height of the projection was 6.2 (μm), and the size of the projection was 83 (μmφ). It should be noted that the height of the projection was set as the height from the center line.

Thus, when an incidental projection is present in the vicinity of the zone N, an abnormal spark occurs from a tip of the projection toward the member to be charged. Or if such a projection is present in the zone N, an excessive pressure is applied to that portion, with the result that a charge is directly injected into the member to be charged. The occurrence of an overcharged portion in the member to be charged is conceivably due to this phenomenon.

Here, when the surface roughness of the film was measured in accordance with JIS B0601, Rz=1.2 (μm), and Rmax=1.8 (μm). Here, the surface roughness defined in JIS B0601 is a value which is determined in a random sampling test for estimating a population mean. Accordingly, it is necessary to sample reference lengths (measurement areas) from areas which exceptionally high ridges or deep valleys, which may be considered as flaws, are not present. For that reason, the reference lengths are selected by rejecting areas where projections are incidentally present. Therefore, the incidental projections are not reflected at all on the surface roughness defined in JIS B0601.

Namely, it was understood that uniform charging cannot be effected unless incidental projections which are not reflected on the surface roughness defined in JIS are taken into consideration. Hereafter, to distinguish between the incidental projections and the surface roughness defined in JIS, the surface roughness defined in JIS is set as the basic roughness.

The surface of a region covering the aforementioned zone N of the film and 0.5 (mm) areas respectively located upstream and downstream thereof was thoroughly inspected by the scanning laser microscope. As a result, it was possible to confirm one incidental projection having a height of 3.4 (μm) and a size of 42 (μmφ) in addition to the aforementioned incidental projections. However, a white streak attributable to overcharging was not confirmed in the image at a portion corresponding to this projection.

Accordingly, the relationship between an incidental projection and uniformity in charging was investigated.

A number of incidental projections were intentionally formed in the vicinity of the zone N, and the relationship between the incidental projections and the image was examined.

A list of the results is shown in Table 6. It should be noted that Table 6 shows the height of the intentionally formed projections, and whether or not a white streak occurred in the image at a portion corresponding to that projection. In the column for the image, the mark ○ denotes "no white streak was observed," and the mark x denotes "a white streak was observed."

TABLE 6

| Height of Projection (μm) | Image |
| --- | --- |
| 3.4 | ○ |
| 4.8 | ○ |
| 5.0 | x |
| 6.2 | x |
| 15.7 | x |

Next, a film was prepared in which the basic roughness was set as Rz=2.5 (μm) and Rmax=3.6 (μm). A number of incidental projections were intentionally formed in the vicinity of a nip of this film. Then this film was similarly evaluated.

A list of the results is shown in Table 7.

TABLE 7

| Height of Projection (μm) | Image |
| --- | --- |
| 5.2 | ○ |
| 5.6 | ○ |
| 5.7 | x |
| 6.5 | x |

Here, although the height of the projection has been set as the height from the center line, a line obtained by adding a value of Rz/2 to the center line is set as a reference line, and the height of the projection is set as the height from that reference line. It should be noted that the newly defined height of the projection will be referred to as the effective height of the projection.

Figure 14:
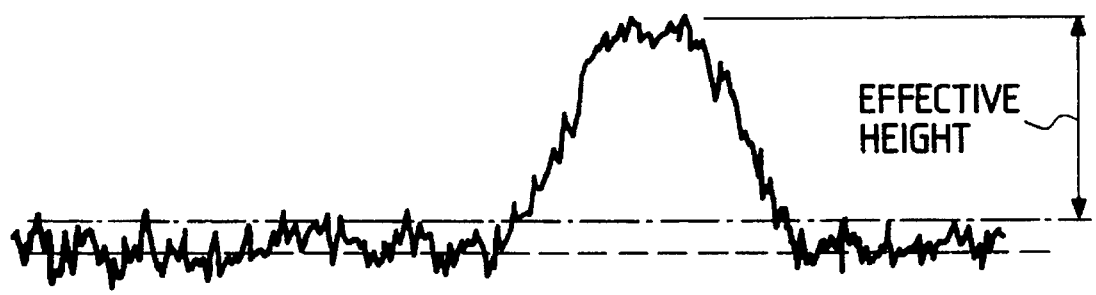
FIG. 14 is a diagram for explaining the effective height of a projection which is defined.

FIG. 14 is a diagram for describing the defined effective height of the projection. FIG. 14 is a diagram which shows the defined effective height of the projection in the cross-sectional profile shown in FIG. 13. The solid line in the drawing represents the cross-sectional profile, the broken line represents the center line, and the alternate long and short dash line represents the reference line. The height from the reference line is the effective height of the projection.

Tables 6 and 7 are rewritten by taking note of the effective height of the projection. The results are shown in Table 8.

TABLE 8

| Height of Projection (μm) | Rz (μm) | Effective Height of Projection (μm) | Image |
| --- | --- | --- | --- |
| 3.4 | 1.2 | 2.8 | ○ |
| 4.8 | 1.2 | 4.2 | ○ |
| 5.0 | 1.2 | 4.4 | x |
| 6.2 | 1.2 | 5.6 | x |
| 15.7 | 1.2 | 15.1 | x |
| 5.2 | 2.5 | 3.95 | ○ |
| 5.6 | 2.5 | 4.35 | ○ |
| 5.7 | 2.5 | 4.45 | x |
| 6.5 | 2.5 | 5.25 | x |

From the results shown in Table 8, it can be appreciated that there is a relationship between the effective height of the projection and the image, and that if the effective height of the projection is 4.4 (μm) or more, the member to be charged is overcharged by that projection, with the result that an image defect in the form of a white streak occurs. Namely, it can be seen that an incidental projection whose height is not less than $(Rz/2+4.4)$ (μm)

must not be present in the vicinity of the zone N.

From this result, if the height of the incidental projection which is present in the vicinity of the zone N of the charging member is set to be less than $(Rz/2+4.4)$ (μm)

then it is possible to prevent an abnormal charging and effect a uniform charging.

It should be noted that this argument is applicable to contact-type chargers in general, including, for instance, a roller charger and a blade charger.

In accordance with the present invention, there is provided a charger for effecting a charging process by bringing a charging member with a voltage applied thereto from an outside source into contact with a member to be charged, characterized in that the charging member is arranged with both ends of a flexible film supported by a support member, and that the film assumes a shape in which a radius of curvature of a portion of the film located downstream of an area of contact between the film and the member to be charged in a moving direction of the member to be charged is smaller than a radius of curvature of a portion of the film located upstream of the area of contact. Accordingly, it becomes possible to reliably and uniformly maintain the discharging gap formed in the vicinity of a contact portion between a charging member and a photosensitive member. It becomes possible to provide a charger which makes it difficult to frictionally deteriorate the member to be charged or the charging member and is capable of effecting a stable and reliable charging process. Furthermore, it becomes possible to provide a charger in which foreign objects such as toner, toner additives, paper dust, and the like are made difficult to remain in the vicinity of the contact portion between the charging member and the photosensitive member.

In accordance with the present invention, there is also provided a charger for effecting a charging process by bringing a charging member with a voltage applied thereto from an outside sources into contact with a member to be charged, characterized in that the charging member is arranged with both ends of a flexible film supported by a support member, and that if it is assumed that a distance between fixed ends of the film is L1, and a length which gives a maximum distance of the film on a curve of the film is set as L4, then L1<L4. Accordingly, it becomes possible to reliably and uniformly maintain the discharging gap formed in the vicinity of the contact portion between the charging member and the photosensitive member. It becomes possible to provide a charger which makes it difficult to frictionally deteriorate the member to be charged or the charging member and is capable of effecting a stable and reliable charging process. Furthermore, it becomes possible to provide a charger in which foreign objects such as toner, toner additives, paper dust, and the like are made difficult to remain in the vicinity of the contact portion between the charging member and the photosensitive member.

In accordance with the present invention, there is also provided a charger for effecting a charging process by bringing a charging member with a voltage applied thereto from an outside source into contact with a member to be charged, characterized in that a contacting force of the charging member with respect to the member to be charged is mainly imparted by an electrostatic attracting force, and the contacting force based on the electrostatic attracting force is greater than a mechanical contacting force. Accordingly, it becomes possible to reliably and uniformly maintain the discharging gap formed in the vicinity of the contact portion between the charging member and the photosensitive member. It becomes possible to provide a charger which makes it difficult to frictionally deteriorate the member to be charged or the charging member and is capable of effecting a stable and reliable charging process. Furthermore, it becomes possible to provide a charger in which foreign objects such as toner, toner additives, paper dust, and the like are made difficult to remain in the vicinity of the contact portion between the charging member and the photosensitive member.

In accordance with the present invention, there is also provided a charger for effecting a charging process by bringing a charging member with a voltage applied thereto from an outside source into contact with a member to be charged, characterized in that if it is assumed that a 10-point mean roughness of the charging member is Rz, a height of an incidental projection which is present on a surface of the charging member is not more than $(Rz/2+4.4)$ (μm).

Accordingly, it becomes possible to reliably and uniformly maintain the discharging gap formed in the vicinity of the contact portion between the charging member and the photosensitive member. Therefore, it is possible to provide a charger capable of effecting a stable and reliable charging process.

What is claimed is:

1. A charger for effecting a charging process by bringing a charging member with a voltage applied thereto from an outside source into contact at a location on a moveable member to be charged, said contact location defining an upstream and a downstream direction, characterized in that said charging member is defined by a flexible film and a support member, said flexible film having two opposite ends supported by said support member such that said film assumes a shape defined by at least first and second radius in which a radius of curvature of a portion of said film located downstream of said contact location between said film and said member to be charged in a moving direction of said member to be charged is smaller than a radius of curvature of a portion of said film located upstream of said contact location.

2. A charger for effecting a charging process by bringing a charging member with a voltage applied thereto from an outside source into contact at a location on a moveable member to be charged, said contact location defining an upstream and a downstream direction, characterized in that said charging member is defined by a flexible film and a support member, said flexible film having two opposite ends supported proximate to each other by said support member and being separated from each other at said support member by a distance L1, and a length which gives a maximum distance of the film on a curve of the film is set as L4, then L1<L4.

3. A charger according to claim 2, wherein the supported flexible film has a substantially tear drop shape whether or not in contact with said member to be charged.

4. A charger according to any one of claims 2 or 3, wherein L1 is such that $0 \leq L1 \leq 1$ (mm).

5. A charger according to any one of claims 1 or 2, wherein bending moment M of the film is such that $M \geq 0.002$ (kg·mm), where $M = w \cdot t^3 \cdot E/(12 \cdot \rho)$ w: effective charging width (mm)

t: film thickness (mm)

E: Young's modulus (kg/mm$^2$) of the film

ρ: radius of curvature of the film on the downstream side of the contact location between the film and the member to be charged.

6. A charger according to any one of claims 1 or 2, wherein flexural rigidity B of the film is such that $B \leq 3.8$ (kg·mm$^2$), where $B = w \cdot t^3 \cdot E/12$ w: effective charging width (mm)

t: film thickness (mm)

E: Young's modulus (kg/mm$^2$) of the film.

7. A charger according to any one of claims 1 or 2, wherein the following inequality is satisfied:

$$.00005 \leq t^3 \cdot E \leq .21$$

where t (mm) is the thickness of the film and (E (kg/mm$^2$), is the Young's modulus thereof.

8. A charger according to any one of claims 1 or 2, wherein the film includes as its constituent element a substance selected at least from nylon resins, polyethylene resins, olefin resins, polyester resins, polyurethane resins, epichlorohydrin-ethylene oxide copolymer rubbers.

9. A charger according to any one of claims 1 or 2, wherein a resistance value R of the film is such that $3 \times 10^5$ (Ω) $\leq R \leq 1 \times 10^8$ (Ω).

10. A charger according to claim 9, wherein the resistance value R of the film is such that $1 \times 10^6$ (Ω) $\leq R \leq 3 \times 10^7$ (Ω).

11. A charger for effecting a charging process by bringing a charging member having a contact surface and with a voltage applied thereto from an outside source, into contact with a member to be charged, characterized in that a contacting force of said charging member with respect to the member to be charged is mainly imparted by an electrostatic attracting force, and the contacting force based on the electrostatic attracting force is greater than a mechanical contacting force.

12. A charger according to claim 11, wherein the mechanical contacting force is 10 (g/cm) or less.

13. A charger according to claim 11, wherein the voltage is supplied to said charging member after the starting of movement of the member to be charged.

14. A charger according to claim 11, wherein said charging member is arranged with both ends of a flexible film supported by a support member, and wherein the film assumes a shape in which a radius of curvature of a portion of the film located downstream of an area of contact between the film and the member to be charged in a moving direction of the member to be charged is smaller than a radius of curvature of a portion of the film located upstream of said area of contact.

15. A charger according to claim 11, wherein said charging member is arranged with both ends of a flexible film supported by a support member, and L1<L4 where L1 is a distance between fixed ends of the film and L2 is a length which gives a maximum distance of the film on a curve of the film.

16. A charger according to any one of claims 14 or 15, wherein flexural rigidity B of the film is such that $B \leq 3.8$ (kg·mm$^2$), where $B = w \cdot t^3 \cdot E/12$
  w: effective charging width (mm)
  t: film thickness (mm)
  E: Young's modulus (kg/mm$^2$) of the film.

17. A charger for effecting a charging process as defined in claim 11, wherein said mechanical force is less than one half of the total contact force comprising at least the combination of said electrostatic force and said mechanical force during operation.

18. A charger according to claim 11, wherein the movement of the member to be charged is stopped after the supply of the voltage to said charging member is stopped.

19. A charger for effecting a charging process by bringing a charging member, having a contact surface and with a voltage applied thereto from an outside source, into contact with a member to be charged, characterized in that a height of an incidental projection which is present on a surface of said charging member is not more than (Rz/2+4.4) (μm)

where Rz is a 10-point mean roughness of said charging member.

20. A charger according to claim 19, wherein said charging member comprises a flexible film, both ends of said flexible film supported by a support member, and wherein the film assumes a shape in which a radius of curvature of a portion of the film located downstream of an area of contact between the film and the member to be charged in a moving direction of the member to be charged is smaller than a radius of curvature of a portion of the film located upstream of said area of contact.

21. A charger according to claim 19, wherein said charging member is arranged with both ends of a flexible film supported by a support member, and L1<L4 where L1 is a distance between fixed ends of the film and L4 is a length which gives a maximum distance of the film on a curve of the film.

22. A charger for effecting a charging process as defined in any one of claims 1, 2, 11 or 19, wherein said charging member's contact surface provides a gap at positions both upstream and down stream of the contact location between said charging member and said member to be charged.

23. A charger for effecting a charging process as defined in any one of claims 1, 2, 11 or 19, wherein said contact location defines a contact zone having a width approximately 0.4 mm.

24. A charger for effecting a charging process as defined in any one of claims 1, 2, 14, 15, 20 or 21, wherein said film is a laminate of plural layers, at least one being conductive and one resistive, said resistive layer being in contact with said member to be charged.

25. A charger for effecting a charging process as defined in any one of claims 1, 2, 11 or 19, wherein said charging member is shaped to disperse forces in the axial direction of the member to be charged.

26. A charging system comprising:
  a member to be charged which is moveable,
  a voltage source,
  a charging member connected to said voltage source, said member comprising a flexible film defined by opposite ends and a sheet surface therebetween, said member being in contact with said member to be charged at an area of contact and defining an upstream and down stream direction with respect to said area of contact,
  wherein said opposite ends of said flexible film are supported by a support member such that said flexible film sheet surface assumes a shape defined by at least first and second radius in which a radius of curvature of a portion of the film located downstream of an area of contact between said flexible film surface and the member to be charged in a moving direction of the member to be charged is smaller than a radius of curvature of a portion of the film located upstream of said area of contact.

27. A charger apparatus for effecting a charging process by bringing a charging member with a voltage applied thereto from an outside source into contact at a location on a moveable member to be charged, said contact location defining an upstream and a downstream direction, characterized in that said charging member is defined by a flexible film and a support member, said flexible film having two opposite ends supported proximate to each other by said support member and being separated from each other at said support member by a distance L1, and said flexible film, when supported, defining an inside curved surface which has opposed portions separated by a maximum distance of L4, wherein L1<L4.

28. A method of effecting a charging process by disposing a charging member with a voltage source connected in contact with a member to be charged, comprising:
  disposing said charging member directly adjacent to and in mechanical contact with said member to be charged, with a first contacting force of said charging member with respect to the member to be charged, and
  applying a voltage to said charging member whereby said member applies a second contacting force with respect to said member to be charged, said second contacting force being mainly imparted by an electrostatic attracting force, and the contacting force based on the electrostatic attracting force is greater than a mechanical contacting force.

29. The method of effecting a charging process as set forth in claim 28, further comprising disconnecting said charging member from said voltage source in order to reduce the second contacting force on said member to be charged.

30. The method of effecting a charging process as set forth in claim 29, wherein the mechanical contacting force is 10 (g/cm) or less.

31. The method of effecting a charging process as set forth in claim 28, further comprising supplying said voltage to said charging member after the starting of movement of the member to be charged, and stopping the movement of the member to be charged after the supply of the voltage to said charging member is stopped.

* * * * *